US012548393B2

(12) United States Patent
Osada et al.

(10) Patent No.: US 12,548,393 B2
(45) Date of Patent: Feb. 10, 2026

(54) SYSTEM, GATE DEVICE, CONTROL METHOD FOR GATE DEVICE, AND STORAGE MEDIUM

(71) Applicant: NEC Corporation, Tokyo (JP)

(72) Inventors: Hiroshi Osada, Tokyo (JP); Masayoshi Yamaura, Tokyo (JP); Osamu Sakaguchi, Tokyo (JP); Kazuya Kojoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 18/287,934

(22) PCT Filed: May 6, 2021

(86) PCT No.: PCT/JP2021/017350
§ 371 (c)(1),
(2) Date: Oct. 23, 2023

(87) PCT Pub. No.: WO2022/234613
PCT Pub. Date: Nov. 10, 2022

(65) Prior Publication Data
US 2024/0194013 A1    Jun. 13, 2024

(51) Int. Cl.
*G07C 9/37* (2020.01)

(52) U.S. Cl.
CPC .................... *G07C 9/37* (2020.01)

(58) Field of Classification Search
CPC ........ G07C 9/37; G07C 9/00; G07C 9/00563; G07C 9/257; G07C 9/38; G07B 15/00
See application file for complete search history.

(56) References Cited

U.S. PATENT DOCUMENTS

| 2022/0084342 A1* | 3/2022 | Masuda | G05B 19/042 |
| 2022/0121734 A1* | 4/2022 | Nakamura | A61B 5/1171 |
| 2023/0076910 A1* | 3/2023 | Kubota | G06V 40/172 |

FOREIGN PATENT DOCUMENTS

| JP | 2001266188 A | * | 9/2001 |
| JP | 2005-135059 A |   | 5/2005 |

(Continued)

OTHER PUBLICATIONS

G. Sundar, V. Anand and J. P. Anita, "Interocular Distance based Facial Recognition," 2020 International Conference on Communication and Signal Processing (ICCSP), Chennai, India, 2020, pp. 1478-1481, doi: 10.1109/ICCSP48568.2020.9182133. (Year: 2020).*

(Continued)

*Primary Examiner* — Kambiz Zand
*Assistant Examiner* — Lawrence Q Truong
(74) *Attorney, Agent, or Firm* — Sughrue Mion, PLLC

(57) ABSTRACT

A gate device includes an authentication request unit, first authentication unit, second authentication unit, and gate control unit. The authentication request unit requests server-based first biometric authentication for a first user in an authentication area and registers successful authentication data. The first authentication unit performs second biometric authentication using a second user's biometric information at a first position against registered data. The second authentication unit performs third biometric authentication using a third user's biometric information at a second position against registered data. Upon successful third authentication, the gate control unit permits gate passage. Upon successful second authentication, the first authentication unit notifies the second user of passage permission

10 Claims, 16 Drawing Sheets

(56) References Cited

FOREIGN PATENT DOCUMENTS

| | | | |
|---|---|---|---|
| JP | 2010-128938 A | | 6/2010 |
| JP | 2012027657 A | * | 2/2012 |
| JP | 2015-001790 A | | 1/2015 |
| JP | 2018055250 A | * | 4/2018 |
| JP | 2019-079264 A | | 5/2019 |
| JP | 2020-057191 A | | 4/2020 |
| WO | WO-2018216289 A1 | * | 11/2018 ........... G01S 5/0269 |

OTHER PUBLICATIONS

International Search Report for PCT Application No. PCT/JP2021/017350, mailed on Jul. 6, 2021.
English translation of Written opinion for PCT Application No. PCT/JP2021/017350, mailed on Jul. 6, 2021.

* cited by examiner

Fig.6

LIST OF SUCCESSFULLY AUTHENTICATED PERSONS

| REGISTRATION TIME | USER ID | BIOLOGICAL INFORMATION |
|---|---|---|
| H1:M1:S1 | ID01 | FV01 |
| H2:M2:S2 | ID02 | FV02 |
| H3:M3:S3 | ID03 | FV03 |
| ... | ... | ... |

Fig.9

USER INFORMATION DATABASE

| USER ID | FEATURE AMOUNT | TYPE OF TICKET | BOARDING STATION | CHARGE AMOUNT | ... |
|---|---|---|---|---|---|
| uID01 | FV1 | NORMAL | S1 | Y1 | ... |
| uID02 | FV2 | NORMAL | — | Y2 | ... |
| uID03 | FV3 | NORMAL | S2 | Y3 | ... |
| ... | ... | ... | ... | ... | ... |

Fig.10

AUTHENTICATION STATUS DATABASE

| GATE ID | PROCESSING STATUS | USER ID |
|---|---|---|
| 20-1 | IN PROCESS | — |
| 20-2 | RESPONDED | uID01 |
| 20-1 | IN PROCESS | — |
| ... | ... | ... |

SYSTEM, GATE DEVICE, CONTROL METHOD FOR GATE DEVICE, AND STORAGE MEDIUM

This application is a National Stage Entry of PCT/JP2021/017350 filed on May 6, 2021, the contents of all of which are incorporated herein by reference, in their entirety.

TECHNICAL FIELD

The present invention relates to a system, a gate device, a method for controlling the gate device, and a storage medium.

BACKGROUND ART

Services using face authentication have started to spread. For example, face authentication has started to be applied to various procedures (e.g., check-in, baggage check-in, security check, etc.) at airports. Alternatively, development of a ticket gate relevant to face authentication is also being continued.

Various technologies related to biometric authentication have been developed.

For example, PTL 1 describes providing an automatic ticket gate system with a face collation function, a face collation server, and an automatic ticket gate with a face collation function that enable or disable passing of a user. The face collation registration machine of PTL 1 acquires a face image of a user, generates face collation data, and transmits the face collation data to a face collation registration server. The face collation registration server receives the face collation data from the face collation registration machine and registers the face collation data in the face collation database. An automatic ticket gate with a face collation function includes a passing control means, which controls whether passing is permitted, based on a collation result of a face collation means, which collates face collation data received from a face collation database with face data of a user and a determination result of a use medium determination means configured to determine a use medium possessed by the user.

PTL 2 describes providing a passage permission device, a passage permission method, and a passage permission program capable of preventing illegal passage and smoothly giving passage permission to a user even when face authentication cannot be performed. In PTL 2, a user carries a recording medium capable of wireless communication. The identification ID of the user is recorded in the recording medium. The passage permission device includes an ID reading unit, an imaging unit, a biological information reading unit, a communication unit, a control unit, and a notification unit.

CITATION LIST

Patent Literature

PTL 1: JP 2005-135059 A
PTL 2: JP 2019-079264 A

SUMMARY OF INVENTION

Technical Problem

A gate device through which many people go in and out, for example, a ticket gate for a railroad requires very high processing performance such as passage control of several tens of people/minute is required during rush hours. In this regard, similar performance is also demanded on the ticket gate adopting the biometric authentication technology. Here, the ticket gate relevant to the biometric authentication determines whether to permit passing through the ticket gate according to the result of the biometric authentication. At that time, if the determination as to whether to permit passing is late, the user cannot determine whether the user is allowed to pass through the ticket gate, and thus stops in front of the ticket gate. On the other hand, if the determination as to whether to permit passing is too early, the authentication is completed in front the ticket gate, and the cut-in passing of another person is permitted.

The problem cannot be solved by applying the techniques disclosed in PTLs 1 and 2. PTL 1 discloses a basic automatic ticket gate using biometric authentication, and PTL 2 merely discloses a technique for complementing the biometric authentication.

A main object of the present invention is to provide a system, a gate device, a method of controlling the gate device, and a storage medium that contribute to enabling a user to pass through a gate at ease.

Solution to Problem

According to a first aspect of the present invention, a system is provided that includes a server device that performs a first biometric authentication using biological information of each of a plurality of users; and a gate device connected to the server device, wherein the gate device includes, an authentication request unit that, when a first user is detected in an authentication area a predetermined distance away from the gate device, requests the server device to perform the first biometric authentication on the detected first user, and registers biological information of the first user who succeeded in the first biometric authentication in a list of successfully authenticated persons, a first authentication unit that, when a second user is detected at a first position closer to the own device than the authentication area, executes a second biometric authentication using biological information of the second user detected at the first position and biological information registered in the list of successfully authenticated persons, a second authentication unit that, when a third user is detected at a second position in the own device, executes a third biometric authentication using biological information of the third user detected at the second position and biological information registered in the list of successfully authenticated persons, and a gate control unit that, when the third biometric authentication is successful, permits the third user to pass through a gate, and when the second biometric authentication is successful, the first authentication unit notifies the second user that the second user can pass through the gate.

According to a second aspect of the present invention, a gate device is provided that includes an authentication request unit that, when a first user is detected in an authentication area a predetermined distance away from an own device, requests a server device to perform a first biometric authentication on the detected first user using biological information of each of a plurality of users, and registers biological information of the first user who succeeded in the first biometric authentication in a list of successfully authenticated persons; a first authentication unit that, when a second user is detected at a first position closer to the own device than the authentication area, executes a second biometric authentication using biological information of the second user detected at the first position and biological information registered in the list of successfully authenticated persons; a second authentication unit that, when a third user is detected at a second position in the own device, executes a third biometric authentication using biological information of the third user detected at the second position and biological information registered in the list of successfully authenticated persons; and a gate control unit that, when the third biometric authentication is successful, permits the third user to pass through a gate, wherein when the second biometric authentication is successful, the first authentication unit notifies the second user that the second user can pass through the gate.

According to a third aspect of the present invention, a method for controlling a gate device is provided, wherein in the gate device, when a first user is detected in an authentication area a predetermined distance away from an own device, a first biometric authentication on the detected first user is requested to a server device that performs the first biometric authentication using biological information of each of a plurality of users; biological information of the first user who succeeded in the first biometric authentication is registered in a list of successfully authenticated persons; when a second user is detected at a first position closer to the own device than the authentication area, a second biometric authentication using biological information of the second user detected at the first position and biological information registered in the list of successfully authenticated persons is executed; when a third user is detected at a second position in the own device, a third biometric authentication using biological information of the third user detected at the second position and biological information registered in the list of successfully authenticated persons is executed; when the third biometric authentication is successful, the third user is permitted to pass through a gate; and when the second biometric authentication is successful, the second user is notified that the second user can pass through the gate.

According to a fourth aspect of the present invention, a computer readable storage medium is provided, the computer readable storage medium storing a program that causes a computer mounted on a gate device to execute processes of requesting, when a first user is detected in an authentication area a predetermined distance away from an own device, a first biometric authentication on the detected first user to a server device that performs the first biometric authentication using biological information of each of a plurality of users; registering biological information of the first user who succeeded in the first biometric authentication in a list of successfully authenticated persons; executing, when a second user is detected at a first position closer to the own device than the authentication area, a second biometric authentication using biological information of the second user detected at the first position and biological information registered in the list of successfully authenticated persons; executing, when a third user is detected at a second position in the own device, a third biometric authentication using biological information of the third user detected at the second position and biological information registered in the list of successfully authenticated persons; permitting, when the third biometric authentication is successful, the third user to pass through a gate; and notifying, when the second biometric authentication is successful, the second user that the second user can pass through the gate.

Advantageous Effects of Invention

According to each aspect of the present invention, a system, a gate device, a method of controlling the gate device, and a storage medium are provided that contribute to allowing a user to pass through a gate at ease. The effect of the present invention is not limited to the above. According to the present invention, other effects may be exhibited instead of or in addition to the effects.

BRIEF DESCRIPTION OF DRAWINGS

FIG. 6 is a diagram illustrating an example of a list of successfully authenticated persons according to the first example embodiment.

FIG. 9 is a diagram illustrating an example of a user information database according to the first example embodiment.

FIG. 10 is a diagram illustrating an example of an authentication status database according to the first example embodiment.

EXAMPLE EMBODIMENT

Figure 1:
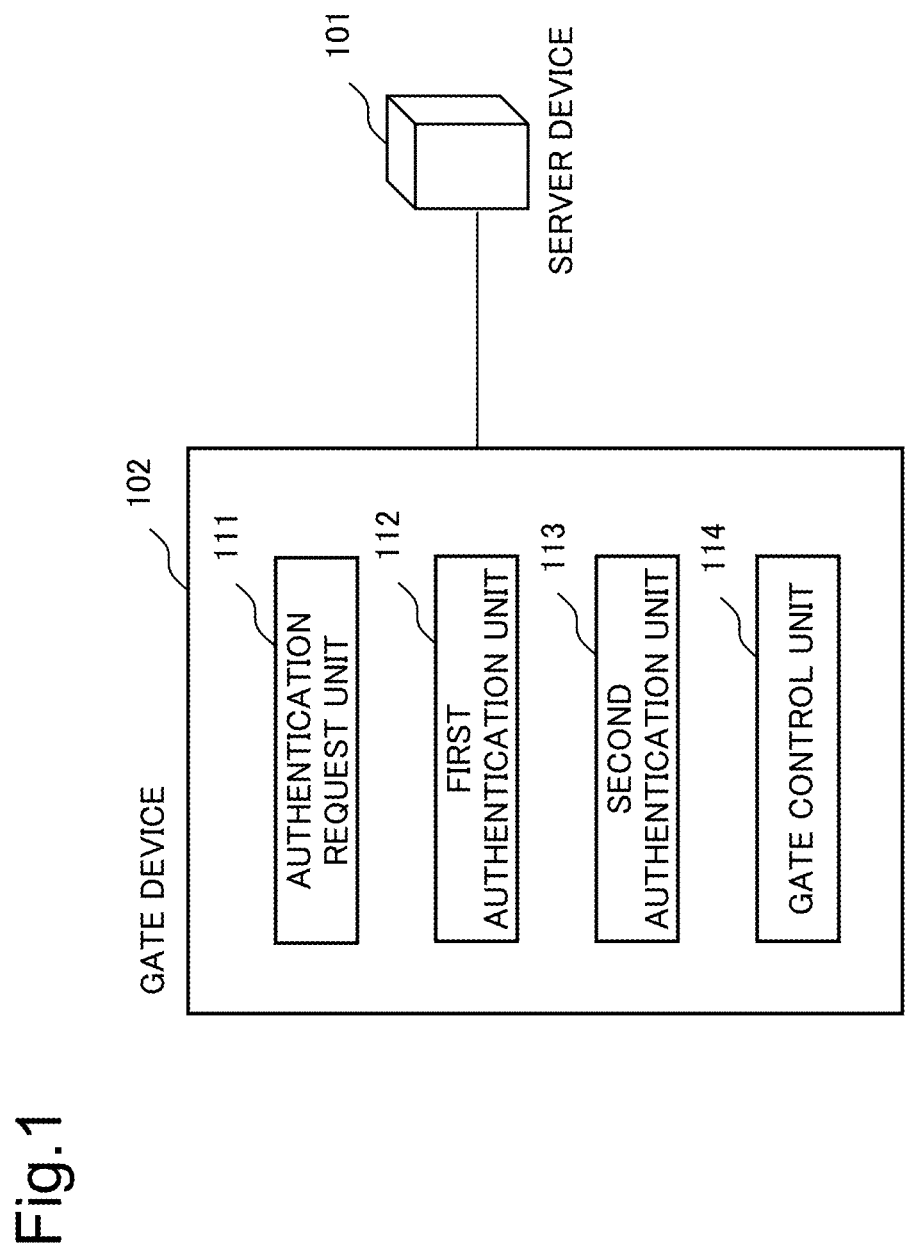
FIG. 1 is a diagram for describing an outline of an example embodiment.

First, an outline of an example embodiment will be described. The reference numerals in the drawings denoted to this outline are given to each element for the sake of convenience as an example for assisting understanding, and the description of this outline is not intended to be any limitation. In addition, in a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description will be omitted.

A system according to an example embodiment includes a server device 101 and a gate device 102 (see FIG. 1). The server device 101 performs first biometric authentication using the biological information of each of a plurality of users. The gate device 102 is connected to the server device 101. The gate device 102 includes an authentication request unit 111, a first authentication unit 112, a second authentication unit 113, and a gate control unit 114. When a first user is detected in an authentication area away from the own device by a predetermined distance, the authentication request unit 111 requests the server device 101 for first biometric authentication related to the detected first user, and registers the biological information of the first user who succeeded in the first biometric authentication in a list of successfully authenticated persons. When a second user is detected at a first position closer to the own device than the authentication area, the first authentication unit 112 executes second biometric authentication using the biological information of the second user detected at the first position and the biological information registered in the list of successfully authenticated persons. When a third user is detected at a second position in the own device, the second authentication unit 113 executes third biometric authentication using the biological information of the third user detected at the second position and the biological information registered in the list of successfully authenticated persons. When the third biometric authentication is successful, the gate control unit 114 allows the third user to pass through the gate. When the second biometric authentication is successful, the first authentication unit 112 notifies the second user that it is possible to pass through the gate.

In the above system, three-stage biometric authentication is performed. The first biometric authentication is performed by the server device 101 connected to the gate device 102. The server device 101 specifies the user (the user in the authentication area) walking toward the gate device 102 by biometric authentication, and determines whether the specified user has a right (qualification) to pass through the gate device 102. When the biometric authentication is successful, the server device 101 transmits the biological information of the user to the gate device 102. The gate device 102 manages the biological information of the successfully authenticated person by the list of successfully authenticated persons. When detecting a user near the entrance of the own device (e.g., two or three steps before the entrance), the gate device 102 performs biometric authentication (second biometric authentication) of the user. At that time, the gate device 102 performs the biometric authentication using the biological information described in the list of successfully authenticated persons. Here, since the biological information of the user who succeeded in the first biometric authentication is stored in the list of successfully authenticated persons, the number of entries is small. Therefore, the second biometric authentication by the gate device 102 ends immediately. When the second biometric authentication is successful, the gate device 102 notifies the user near the entrance that the user may enter the gate device 102. The user who has come in contact with the notification can enter inside without stopping in front of (hesitating to enter) the gate device 102. In addition, when a user who has not received the first biometric authentication (a user whose qualification to pass through the gate device 102 is unknown) enters from the side of the gate device 102, the biological information of the user is not stored in the list of successfully authenticated persons, and the third biometric authentication fails. When the third biometric authentication fails, the gate device 102 closes the gate and rejects the user's passage through the gate. As described above, the user who has the right to pass through the gate device 102 can pass through gate device 102 at ease, whereas the user whose authority to pass through the gate device 102 is unknown cannot pass through the gate device 102.

Hereinafter, specific example embodiments will be described in more detail with reference to the drawings.

First Example Embodiment

A first example embodiment will be described in more detail with reference to the drawings.

[System Configuration]

Figure 2:
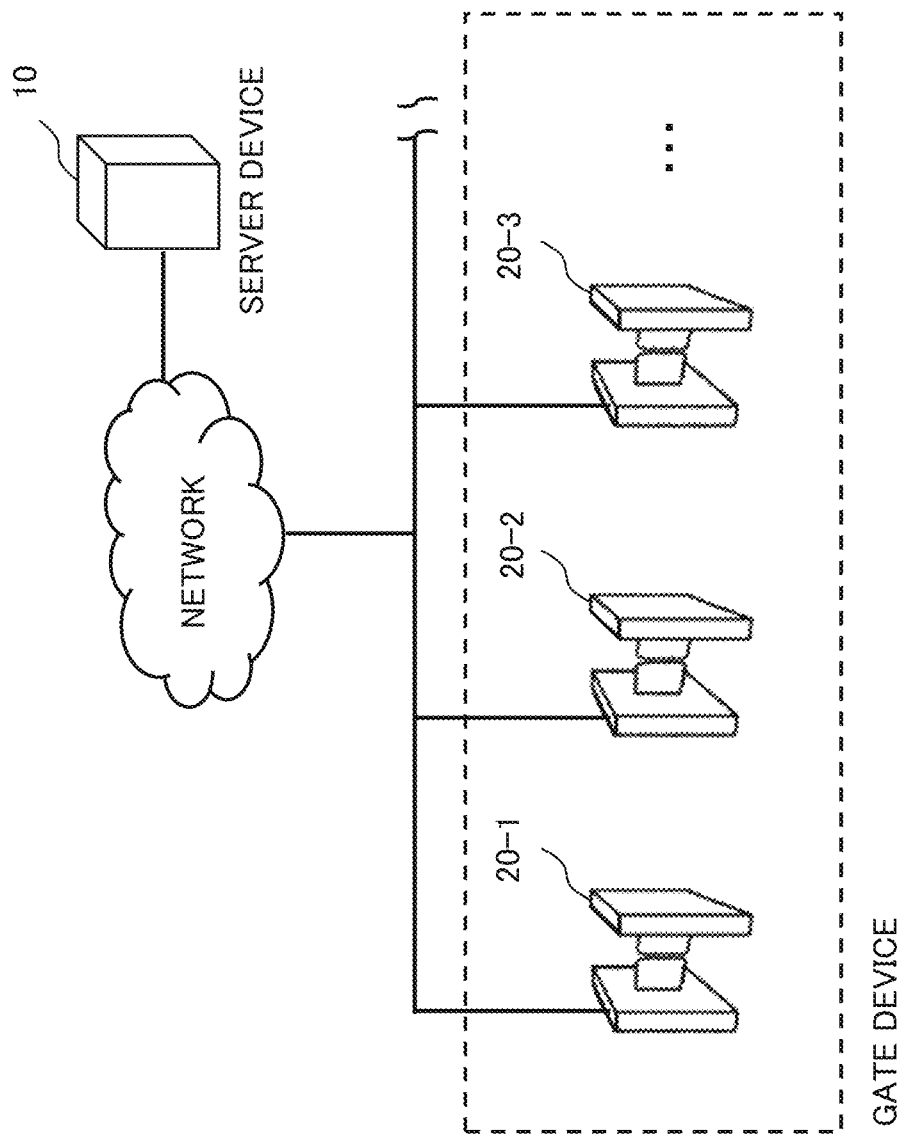
FIG. 2 is a diagram illustrating an example of a schematic configuration of an authentication system according to a first example embodiment.

FIG. 2 is a diagram illustrating an example of a schematic configuration of an authentication system according to a first example embodiment. Referring to FIG. 2, the authentication system includes a server device 10 and a plurality of gate devices 20-1 to 20-3.

In the following description, in a case where there is no particular reason to distinguish the gate devices 20-1 to 20-3, they are simply referred to as "gate devices 20". Similarly, other configurations are represented by the reference signs on the left side of the hyphen.

The server device 10 and the gate device 20 are configured to be able to communicate with each other by wired or wireless communication means. The server device 10 may be installed in the same building as the gate device 20, or may be installed on a network (cloud).

The server device 10 is a device that controls the entire authentication system. The server device 10 is a device that performs biometric authentication of a user who is about to pass through the gate device 20. The server device 10 performs first biometric authentication using the biological information of each of a plurality of users. If the user is qualified (has the right, authority) to pass through the gate device 20, the server device 10 permits the passage of the user. If the user is not qualified to pass through the gate device 20, the server device 10 rejects the passing of the user.

The gate device 20 is, for example, a device installed at an airport or a station. The gate device 20 controls the passing of the user. The gate device 20 responds to the passage from both directions. In the first example embodiment, the gate device 20 will be described as a ticket gate installed at a station. However, it is a matter of course that the gate device 20 is not intended to be limited to a ticket gate installed at a station.

Figure 3:
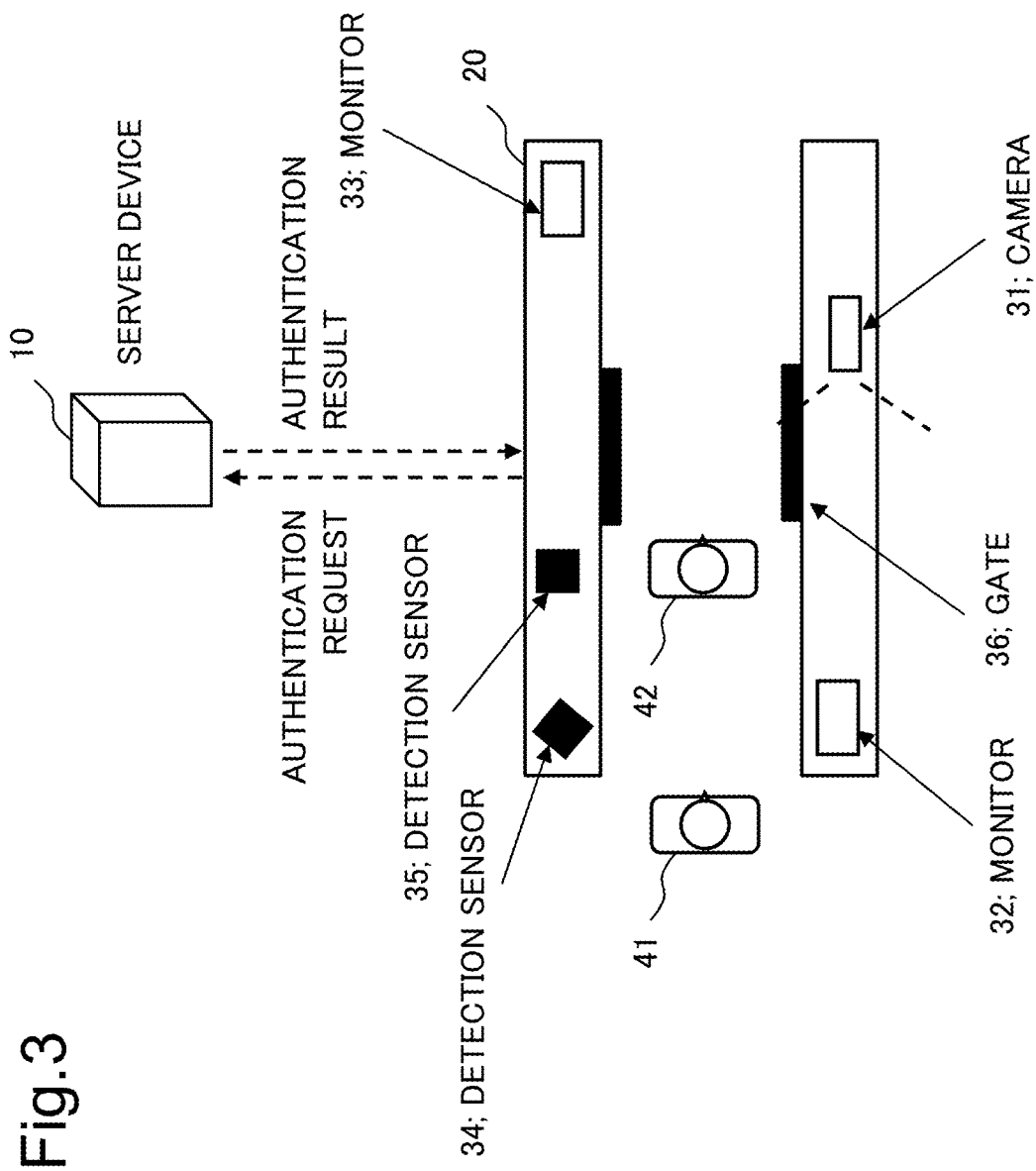
FIG. 3 is a plan view illustrating an example of a schematic configuration of a gate device according to the first example embodiment.

FIG. 3 is a view illustrating an example of a plan view when the gate device 20 is visually recognized from above. As illustrated in FIG. 3, the gate device 20 includes a camera 31. The camera 31 is installed in such a way as to be able to photograph a user approaching the gate device 20 from the left side. The gate device 20 responds to the passage from both directions, and thus includes a camera that photographs a user approaching the gate device 20 from the right side, but is not illustrated in the drawings including FIG. 3.

The gate device 20 includes two monitors 32 and 33. The monitor 32 is installed in such a way as to be visually recognizable by a user walking from the left side. The monitor 33 is installed in such a way as to be visually recognizable by a user walking from the right side.

The gate device 20 includes a detection sensor that detects a user. Specifically, the gate device 20 includes a detection sensor 34 for detecting a user 41 present near the left entrance, and a detection sensor 35 for detecting the user 42 who has entered the gate device 20. In FIG. 3 and the like, illustration of a sensor for detecting the user at the right entrance or the user who has entered the gate device 20 from the right side is omitted.

The gate device 20 includes a gate 36. The gate 36 controls passing of a user who has entered the gate device 20.

The drawings such as FIG. 3 are not intended to limit the configuration and number of devices included in the gate device 20. For example, the gate 36 that restricts the passing of the user who entered the gate device 20 from the left side and the gate 36 that restricts the passing of the user who entered the gate device 20 from the right side may be different.

[Outline of System Operation]

Figure 4:
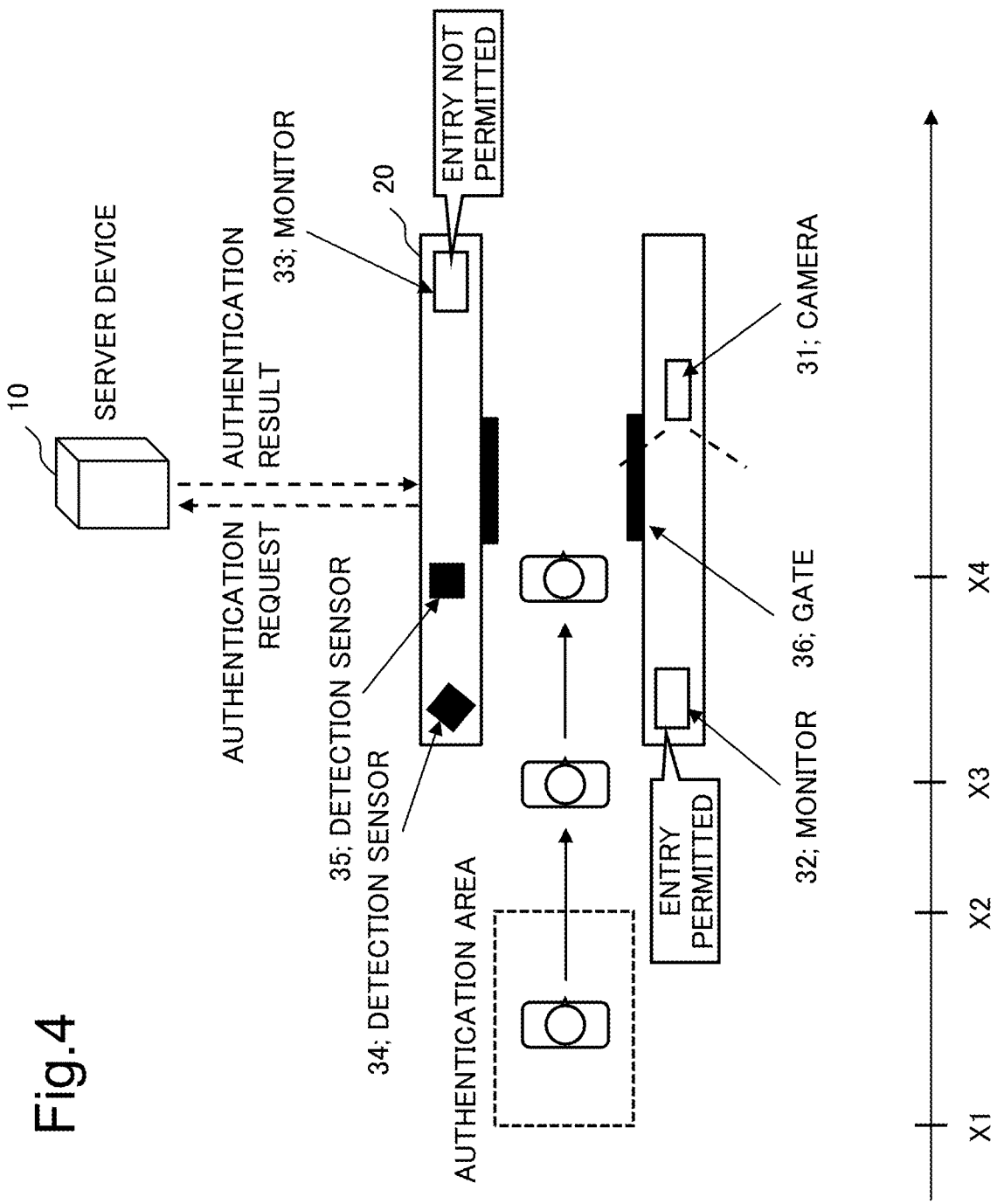
FIG. 4 is a diagram for describing a schematic operation of the authentication system according to the first example embodiment.

Next, an outline of an operation of the authentication system according to the first example embodiment will be described with reference to the drawings. FIG. 4 is a diagram for describing a schematic operation of the authentication system according to the first example embodiment. With reference to FIG. 4, an operation for a case where the user approaches the gate device 20 from the left side will be described. The operation for a case where the user approaches from the right side of the gate device 20 may be described by interchanging the left and right sides of the following description, and thus the description thereof will be omitted.

The gate device 20 acquires biological information (e.g., a face image) of a person who has reached an authentication area (positions X1 to X2) set in front of the own device. The gate device 20 detects the user who has reached the authentication area by photographing the authentication area.

When detecting the user in the authentication area away from the own device by a predetermined distance, the gate device 20 requests the server device 10 for biometric authentication of the detected user. Specifically, the gate device 20 transmits an "authentication request" including the biological information of the user to the server device 10.

The server device 10 that has received the authentication request specifies the user by a collation process (authentication process; first biometric authentication) using the biological information registered in advance. The server device 10 determines whether the specified user has the qualification to pass through the gate device 20. For example, the server device 10 confirms a charge amount or the like of the preregistered user, and determines whether to allow the person to be authenticated to pass. When determining whether to allow the person to be authenticated to pass, the server device 10 may make an inquiry to an external server or the like. Whether to make an inquiry to an external server or the like depends on the specification, design, and the like of the system, and is different from the gist of the disclosure of the present application, and hence the description of the configuration of the system including the external server will be omitted.

The server device 10 transmits a response (authentication result) with respect to the authentication request to the gate device 20, which is a transmission source of the request. Specifically, when determined to "passing permitted", the server device 10 transmits a positive response indicating authentication success to the gate device 20. The server device 10 transmits, to the gate device 20, a positive response including the user ID of the user who succeeded in the authentication and the biological information (feature amount) of the successfully authenticated person.

When determined to "passing not permitted", the server device 10 transmits a negative response indicating authentication fail to the gate device 20.

By setting the authentication area sufficiently away from the gate device 20, the biometric authentication by the server device 10 is completed before the user (person to be authenticated) reaches near the entrance of the gate device 20 (position X3). That is, before the user reaches the entrance of the gate device 20, the authentication result is transmitted to the gate device 20. In other words, the position of the authentication area (distance to the gate device 20) is determined such that the biometric authentication of the server device 10 is terminated before the user in the authentication area reaches the entrance of the gate device 20.

When receiving the negative response (authentication fail), the gate device 20 discards the authentication result related to the authentication fail.

When receiving the positive response (authentication success), the gate device 20 registers the biological information (feature amount) and the user ID acquired from server device 10 in the "list of successfully authenticated persons".

The user passes through the authentication area and reaches the entrance (position X3) of the gate device 20. The gate device 20 detects the user at the entrance using the detection sensor 34.

The gate device 20 acquires biological information (face image) of the user who has reached the entrance using the camera 31. The gate device 20 executes the collation process (authentication process, second biometric authentication) that uses the acquired biological information and the biological information described in the list of successfully authenticated persons.

When the biometric authentication is successful, the gate device 20 displays "entry permitted" or "passing permitted" on the monitor 32. Furthermore, the gate device 20 displays "entry not permitted" or "passing not permitted" on the monitor 33 on the side opposite to the monitor 32.

When the biometric authentication is unsuccessful, the gate device 20 displays "entry not permitted" or "passing not permitted" on the monitor 32.

The user (person to be authenticated) who has viewed the display such as "passing permitted" can advance into the gate device 20 at ease. On the other hand, the user who has viewed the display such as "passing not permitted" returns without advancing into the gate device 20.

The user who has entered the gate device 20 reaches just before the gate 36 (arrives at the position X4). The gate device 20 detects the user who has reached front of the gate 36 using the detection sensor 35.

The gate device 20 acquires biological information (face image) of the user who has reached the gate 36 using the camera 31. The gate device 20 executes the collation process (authentication process, third biometric authentication) that uses the acquired biological information and the biological information described in the list of successfully authenticated persons.

When the biometric authentication is successful, the gate device 20 maintains the open state of the gate 36 and permits the user to pass through the gate. When the biometric authentication fails, the gate device 20 closes the gate 36 and rejects the user's passage through the gate.

When the third biometric authentication is successful, the gate device 20 notifies the server device 10 of the passage of the user through the gate device 20. Specifically, the gate device 20 transmits, to the server device 10, a "gate passage notification" including the user ID of the user who has been permitted to pass through the gate (the user who succeeded in the third biometric authentication).

The server device 10 specifies the user (passenger) who has passed through the gate device 20 using the user ID, and records the fact that the specified user has passed through the gate device 20. That is, the server device 10 records that the user who succeeded in the third biometric authentication executed the right to pass through the gate device 20.

Examples of the biological information of the user include, for example, data (feature amount) calculated from physical features unique to an individual such as a face and an iris pattern (pattern). Alternatively, the biological information of the user may be image data such as a face image and an iris image. The biological information of the user may include the physical features of the user as information. In the first example embodiment, description will be made using a person's face image or a feature amount generated from the face image as biological information.

The configuration illustrated in FIG. 2 and the like is an example and is not intended to limit the configuration of the system. For example, the authentication system may include at least one or more gate devices 20. Each gate device 20 may be installed in the same place (e.g., the same station), or may be installed in different places.

Next, details of the gate device 20 and the server device 10 included in the authentication system according to the first example embodiment will be described.

[Gate Device]

Figure 5:
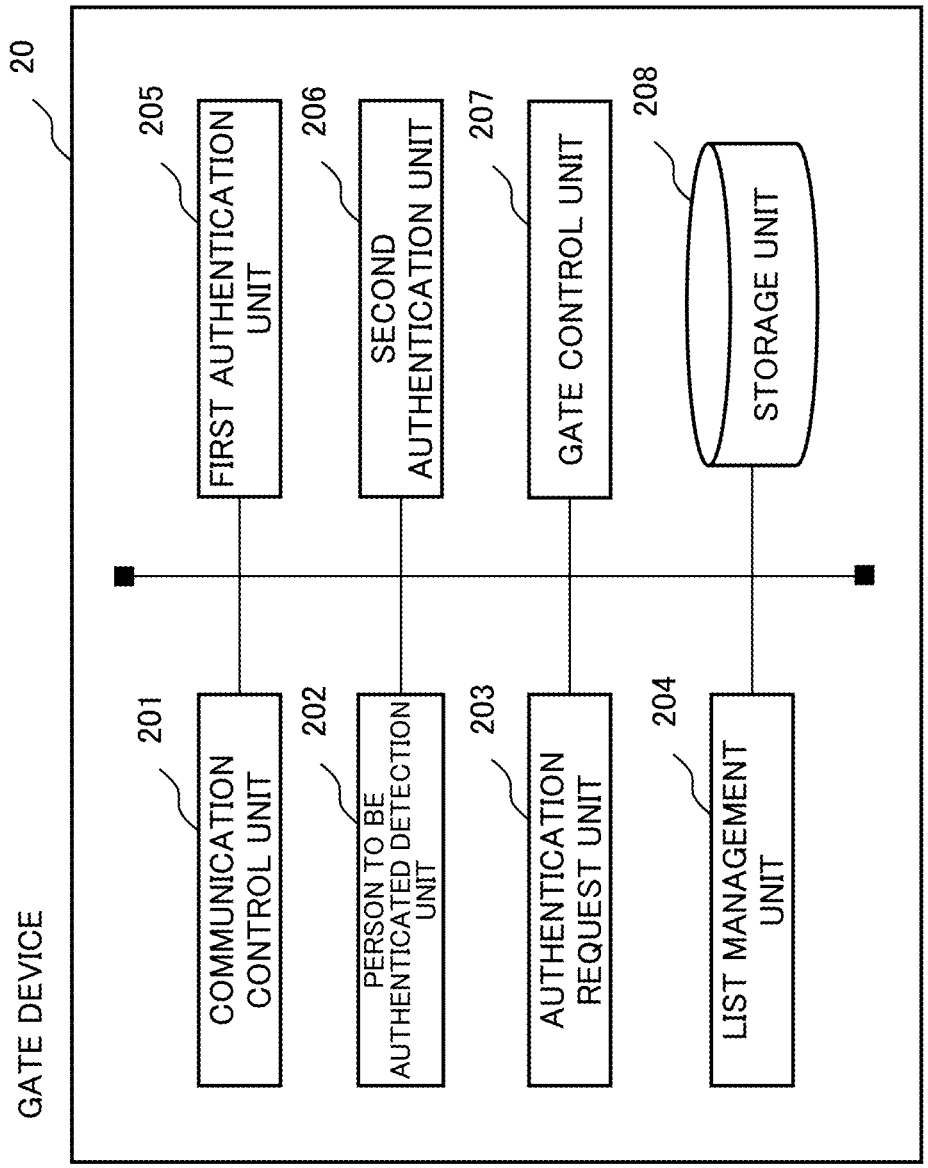
FIG. 5 is a diagram illustrating an example of a processing configuration of the gate device according to the first example embodiment.

FIG. 5 is a diagram illustrating an example of a processing configuration (processing module) of the gate device 20 according to the first example embodiment. Referring to FIG. 5, the gate device 20 includes a communication control unit 201, a person to be authenticated detection unit 202, an authentication request unit 203, a list management unit 204, a first authentication unit 205, a second authentication unit 206, a gate control unit 207, and a storage unit 208.

The communication control unit 201 is a means that controls communication with other devices. For example, the communication control unit 201 receives data (packet) from the server device 10. Furthermore, the communication control unit 201 transmits data toward the server device 10. The communication control unit 201 delivers data received from another device to another processing module. The communication control unit 201 transmits data acquired from another processing module toward another device. In this manner, the other processing modules transmit and receive data to and from other devices via the communication control unit 201.

The person to be authenticated detection unit 202 is a means that detects the person to be authenticated (first user) in the authentication area. The person to be authenticated detection unit 202 acquires image data from the camera 31 periodically or at a predetermined timing. The person to be authenticated detection unit 202 attempts to extract a face image from the acquired image data.

Since an existing technique can be used for the face image extraction process by the person to be authenticated detection unit 202, detailed description thereof will be omitted. For example, the person to be authenticated detection unit 202 may extract a face image (face region) from the image data by using a learning model learned by a convolutional neural network (CNN). Alternatively, the person to be authenticated detection unit 202 may extract the face image using a method such as template matching.

When the face image is extracted, the person to be authenticated detection unit 202 calculates an interocular distance from the face image. Specifically, the person to be authenticated detection unit 202 extracts the left and right eyes from the face image and calculates the length (the number of pixels) of a straight line connecting the extracted eyes.

The person to be authenticated detection unit 202 executes a threshold process on the calculated interocular distance, and determines whether the person to be authenticated exists in the authentication area (positions X1 to X2) according to the result. Specifically, when the interocular distance is within a predetermined range, the person to be authenticated detection unit 202 determines that the person to be authenticated is detected in the authentication area. When the interocular distance is outside the predetermined range, the person to be authenticated detection unit 202 determines that the person to be authenticated does not exist in the authentication area. In this manner, the person to be authenticated detection unit 202 detects the person to be authenticated based on the interocular distance calculated from the face image included in the image data obtained by photographing the predetermined area (positions X1 to X2).

The person to be authenticated detection unit 202 delivers the face image at the time of detecting the person to be authenticated to the authentication request unit 203.

The authentication request unit 203 is a means that requests the server device 10 to authenticate the person to be authenticated detected by the person to be authenticated detection unit 202. When the face image is acquired from the person to be authenticated detection unit 202, the authentication request unit 203 generates a feature amount (a feature vector including a plurality of feature amounts) from the acquired face image.

Since an existing technique can be used for the feature amount generation process, detailed description thereof will be omitted. For example, the authentication request unit 203 extracts eyes, nose, mouth, and the like as feature points from the face image. Thereafter, the authentication request unit 203 calculates the position of each feature point and the distance between the feature points as feature amounts, and generates a feature vector (vector information characterizing the face image) including a plurality of feature amounts.

The authentication request unit 203 generates an authentication request including the generated feature amount (biological information) and the gate ID, and transmits the authentication request to the server device 10. The gate ID is identification information for identifying the gate device 20. As the gate ID, a media access control (MAC) address or an Internet protocol (IP) address of the gate device 20 can be used. Alternatively, the gate ID may be system specific identification information (identification ID). Determination can be made that the transmitted authentication request is from the permitted gate device 20 by holding the identification ID as a master also on the server device 10 side. Even in one gate device 20, the gate ID at the time of entering the station and the gate ID at the time of exiting the station may be set to different values.

The authentication request unit 203 receives a response (a response including an authentication result) to the authentication request from the server device 10.

When an authentication fail (negative response) is received, the authentication request unit 203 discards the received negative response.

When receiving the authentication success (positive response), the authentication request unit 203 registers the user ID included in the positive response and the biological information (feature amount) in the "list of successfully authenticated persons list" (see FIG. 6). In addition, the authentication request unit 203 records the time when the user ID and the like are registered in the list of successfully authenticated persons.

When a first user is detected in an authentication area away from the own device by a predetermined distance, the authentication request unit 203 requests the server device 10 for the first biometric authentication related to the detected first user. The authentication request unit 203 registers at least the biological information of the first user who succeeded in the first biometric authentication in the list of successfully authenticated persons.

The list management unit 204 is a means that manages a list of successfully authenticated persons. The list management unit 204 accesses the list of successfully authenticated persons periodically or at a predetermined timing, and deletes any unnecessary entry.

The list management unit 204 checks the registration time field of each entry and deletes an entry for which a predetermined period has elapsed since the entry was added to the list of successfully authenticated persons. That is, the list management unit 204 deletes an entry for which a predetermined period has elapsed since the registration.

According to the operation of the list management unit 204, even in a case where the user detected as the person to be authenticated has moved to another place without heading toward the gate device 20, the entry of such a person to be authenticated is deleted.

In a case where the entry is deleted when a predetermined period has elapsed from the registration, the list management unit 204 may notify the server device 10 of the deletion. The list management unit 204 may notify the server device 10 of the user ID and cancel the authentication of the relevant person to be authenticated.

In addition, the list management unit 204 acquires "gate passage notification" from the gate control unit 207. The list management unit 204 deletes an entry (entry of the list of successfully authenticated persons) relevant to the user ID included in the notification.

In this manner, the list management unit 204 deletes the entry (biological information, user ID) for which the predetermined period has elapsed since the registration to the list of successfully authenticated persons. Furthermore, in response to the third user passing through the gate 36, the list management unit 204 deletes the entry (biological information, user ID) of the third user from the list of successfully authenticated persons.

The first authentication unit 205 is a means that authenticates the person to be authenticated (user) who has reached near the entrance of gate device 20. The first authentication unit 205 detects the person to be authenticated who has reached near the entrance of the gate device 20 based on the detection signal from the detection sensor 34. In the example of FIG. 3, the first authentication unit 205 detects the user 41.

When the person to be authenticated is detected, the first authentication unit 205 acquires biological information (face image) of the person to be authenticated by using the camera 31. The first authentication unit 205 generates a feature amount (a feature vector including a plurality of feature amounts) from the acquired face image.

The first authentication unit 205 sets the generated feature amount (biological information) as a collation target and performs a collation process with the feature amount (biological information) recorded in the list of successfully authenticated persons. More specifically, the first authentication unit 205 sets a feature amount generated by photographing the person to be authenticated (user) near the entrance as a collation target, and executes one-to-N(N is a positive integer, and the same applies hereinafter) collation with a plurality of feature amounts registered in the list of successfully authenticated persons.

The first authentication unit 205 calculates similarity between the feature amount (feature vector) of the collation target and each of the plurality of feature amounts on the registration side. A chi-square distance, a Euclidean distance, or the like can be used for the similarity. The similarity is lower the longer the distance, and the similarity is higher the shorter the distance.

When the feature amount having the similarity of equal to or more than the predetermined value is not registered in the list of successfully authenticated persons, the first authentication unit 205 sets the authentication result to "authentication fail".

When the feature amount having the similarity of equal to or more than the predetermined value is registered in the list of successfully authenticated persons, the first authentication unit 205 sets the authentication result to "authentication success".

When the authentication result is "authentication success", the first authentication unit 205 displays "entry permitted" or the like on the monitor 32 on the side where the user is detected. Furthermore, the first authentication unit 205 displays "entry not permitted" or the like on the monitor 33 on the side opposite to the side where the user is detected.

When the authentication result is "authentication fail", the first authentication unit 205 displays "entry not permitted" or the like on the monitor 32.

As described above, when the second user is detected at the first position (the entrance of the gate device 20) closer to the own device than the authentication area, the first authentication unit 205 executes the second biometric authentication using the biological information of the second user and the biological information registered in the list of successfully authenticated persons. When the second biometric authentication is successful, the first authentication unit 205 notifies the second user that the second user can pass through the own device (gate device 20, gate 36). Furthermore, when the second biometric authentication is successful, the first authentication unit 205 notifies the fourth user on the side opposite to the side where the second user is detected that the fourth user cannot pass through the gate device 20.

The second authentication unit 206 is a means that authenticates the person to be authenticated (user) who has reached just before the gate 36. The second authentication unit 206 detects the person to be authenticated who has reached just before the gate 36 based on the detection signal from the detection sensor 35. In the example of FIG. 3, the second authentication unit 206 detects the user 42.

When the person to be authenticated is detected, the second authentication unit 206 acquires biological information (face image) of the person to be authenticated by using the camera 31. The second authentication unit 206 generates a feature amount (a feature vector including a plurality of feature amounts) from the acquired face image.

The second authentication unit 206 performs biometric authentication using the generated feature amount and the feature amount registered in the list of successfully authenticated persons. The second authentication unit 206 notifies the gate control unit 207 of an authentication result (authentication success, authentication fail). When notifying the gate control unit 207 of the authentication success, the second authentication unit 206 notifies the gate control unit 207 of the user ID of the successfully authenticated person.

As described above, when the third user is detected at the second position (just before the gate 36) in the own device, the second authentication unit 206 executes the third biometric authentication using the biological information of the third user detected at the second position and the biological information registered in the list of successfully authenticated persons.

The gate control unit 207 is a means to control the gate 36. When the third biometric authentication is successful, the gate control unit 207 allows the third user to pass through the gate 36. More specifically, the gate control unit 207 maintains the open state of the gate 36 when the authentication result acquired from the second authentication unit 206 is "authentication success". When the acquired authentication result is "authentication fail", the gate control unit 207 closes the gate 36 to block the passing of the user.

When the user is permitted to pass through the gate, the gate control unit 207 transmits a "gate passage notification" including the user ID and the gate ID of the user to the server device 10. In addition, the gate control unit 207 also transmits the gate passage notification to list management unit 204.

The storage unit 208 is a means that stores information necessary for the operation of gate device 20.

Figure 7:
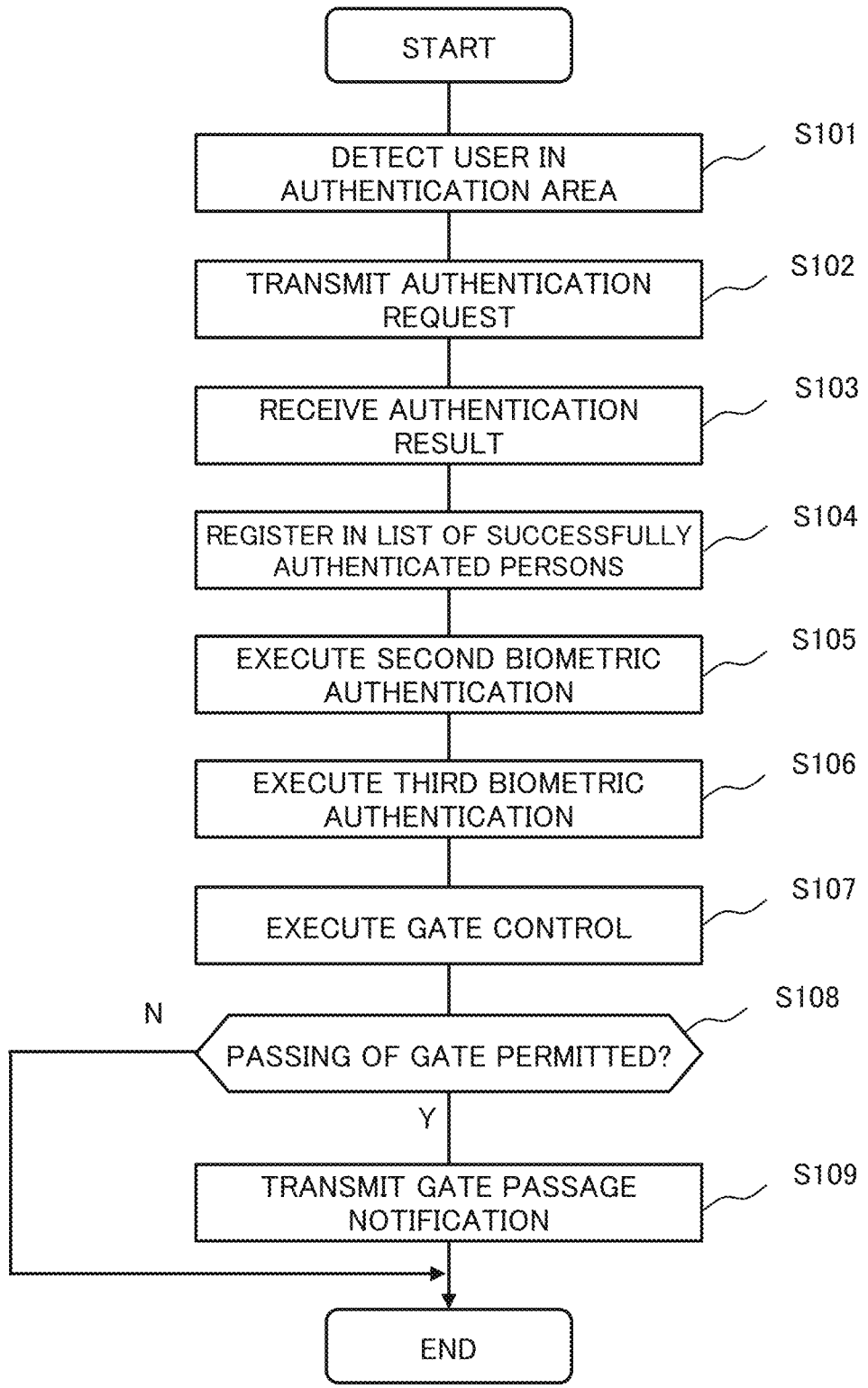
FIG. 7 is a flowchart illustrating an example of an operation of the gate device according to the first example embodiment.

FIG. 7 is a flowchart illustrating an example of the operation of the gate device 20 according to the first example embodiment.

The gate device 20 detects the user in the authentication area (step S101).

The gate device 20 transmits an authentication request including the biological information of the user and the gate ID to the server device 10 (step S102).

The gate device 20 receives the authentication result from the server device 10 (step S103). The gate device 20 receives the result of the first biometric authentication by the server device 10.

When the authentication success is received, the gate device 20 registers the user ID and the biological information notified from the server device 10 in the list of successfully authenticated persons (step S104).

When the user arrives just before the entrance of the gate device 20, the gate device 20 executes the second biometric authentication using the biological information of the user and the biometric authentication registered in the list of successfully authenticated persons (step S105).

When the second biometric authentication is successful, the gate device 20 clearly indicates that the user can enter the gate device 20, such as "entry permitted" on the monitor 32 or 33 on the side where the user is detected.

When the user reaches just before the gate 36 installed inside the gate device 20, the gate device 20 executes the third biometric authentication using the biological information of the user and the biological information registered in the list of successfully authenticated persons (step S106).

The gate device 20 performs opening/closing control of the gate 36 based on the result of the third biometric authentication (step S107).

When the user is permitted to pass through the gate 36 (step S108, Yes branch), the gate device 20 transmits a "gate passage notification" including the user ID of the gate passer and the gate ID to the server device 10 (step S109).

When the user is not permitted to pass through gate 36 (step S108: No branch), the gate device 20 does not take any special measure.

Alternatively, the gate device 20 may output, to the user, a message indicating that the user cannot pass through the gate device 20 and urging the user to go to a person in charge (station staff).

[Server Device]

Figure 8:
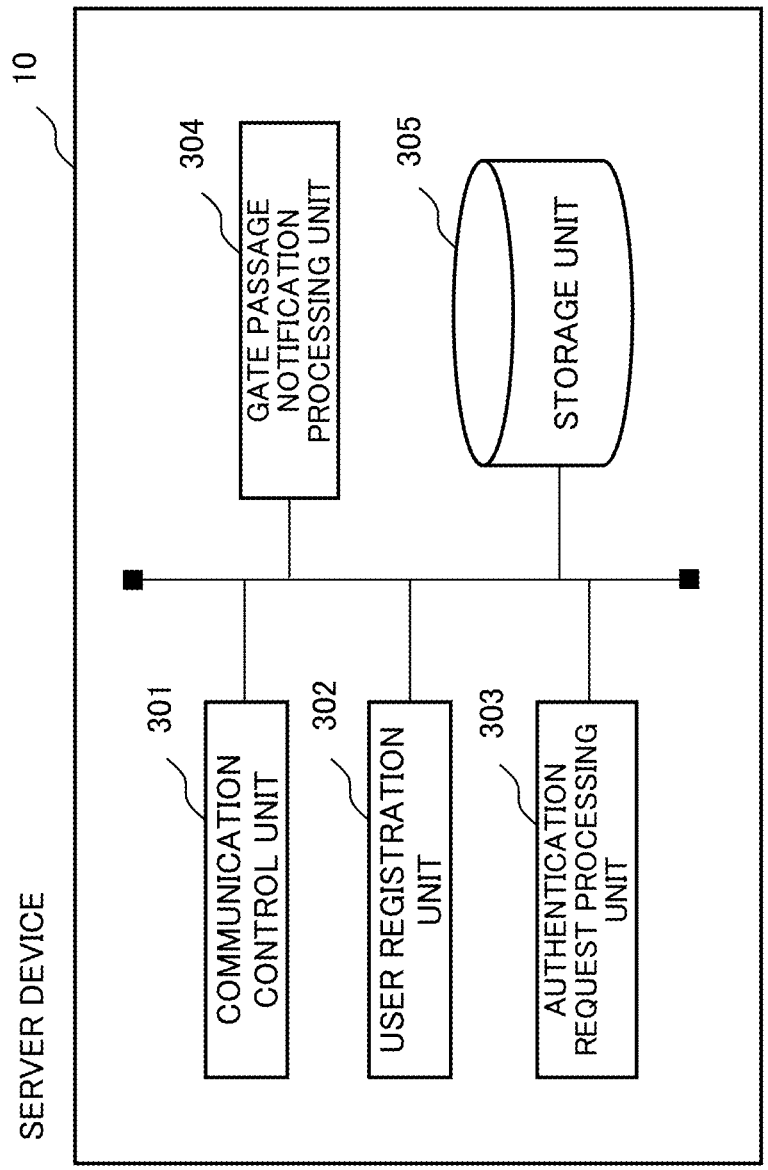
FIG. 8 is a diagram illustrating an example of a processing configuration of the server device according to the first example embodiment.

FIG. 8 is a diagram illustrating an example of a processing configuration (processing module) of the server device 10 according to the first example embodiment. Referring to FIG. 8, the server device 10 includes a communication control unit 301, a user registration unit 302, an authentication request processing unit 303, a gate passage notification processing unit 304, and a storage unit 305.

The communication control unit 301 is a means that controls communication with other devices. For example, the communication control unit 301 receives data (packet) from the gate device 20. Furthermore, the communication control unit 301 transmits data toward the gate device 20. The communication control unit 301 delivers data received from another device to another processing module. The communication control unit 301 transmits data acquired from another processing module to another device. In this manner, the other processing modules transmit and receive data to and from other devices via the communication control unit 301.

The user registration unit 302 is a means that performs system registration of a user who can pass through the gate device 20. The user registration unit 302 acquires biological information (e.g., a face image) of a user who can pass through the gate device 20 using an associated means.

For example, the system user inputs biological information and personal information (name, address, etc.) to the server device 10 using a web (WEB) page of a railway company or a kiosk terminal installed at a station.

When the face image is acquired, the user registration unit 302 calculates a feature amount from the face image. The user registration unit 302 registers the biological information (e.g., the feature amount calculated from the face image) of the user in the "user information database" together with the user ID for identifying the system user (the registrant of the biological information) (see FIG. 9).

The user registration unit 302 registers information (business information) necessary for the authentication process of the user in the user information database as necessary. For example, in a case where the server device 10 processes an authentication request from a ticket gate (gate device 20) installed at a station, the user registration unit 302 stores information such as a charge amount and biological information in the user information database in association with each other.

The user information database illustrated in FIG. 9 is an example, and other items may be stored in association with the biological information (feature amount). For example, the user's name or face image may be registered in the user information database.

The authentication request processing unit 303 is a means that processes the authentication request received from the gate device 20.

The authentication request processing unit 303 manages the status of the authentication process using the authentication status database (see FIG. 10). Upon receiving the authentication request, the authentication request processing unit 303 extracts the gate ID from the authentication request. The authentication request processing unit 303 adds a new entry to the authentication status database and stores the extracted gate ID. In addition, the authentication request processing unit 303 sets "in process" to the processing status of the additionally written entry. In FIG. 10, for the sake of easy understanding, the gate ID is denoted by a reference sign of the gate device 20.

When information is registered in the authentication status database, the authentication request processing unit 303 sets the biological information (feature amount) included in the authentication request as a collation target, and performs the collation process (first biometric authentication) with the biological information registered in the user information database.

More specifically, the authentication request processing unit 303 sets the feature amount extracted from the authentication request as the collation target, and executes the one-to-N collation with the plurality of feature amounts registered in the user information database.

The authentication request processing unit 303 calculates similarity between the feature amount (feature vector) of the collation target and each of the plurality of feature amounts on the registration side.

When the feature amount having a similarity of equal to or more than the predetermined value is not registered in the user information database, the authentication request processing unit 303 sets "authentication fail" in the authentication result.

When the feature amount having a similarity of equal to or more than the predetermined value is registered in the user information database, the authentication request processing unit 303 determines whether the user specified by the collation process is qualified to pass through the gate device 20.

For example, when the authentication request received from the gate device 20 at the time of entering the station is processed, the authentication request processing unit 303 determines whether the charge amount of the specified user is a balance of equal to or more than the minimum fare. If the balance of the charge amount is equal to or less than the minimum fare, the authentication request processing unit 303 determines that the specified user is not qualified to pass through the gate device 20. If the balance of the charge amount is greater than the minimum fare, the authentication request processing unit 303 determines that the specified user is qualified to pass through the gate device 20.

For example, when the authentication request received from the gate device 20 at the time of exiting the station is processed, the authentication request processing unit 303 determines whether the boarding station is set to the specified user. When the boarding station is not set, the authentication request processing unit 303 determines that the specified user is not qualified to pass through the gate device 20. When the boarding station is set, the authentication request processing unit 303 calculates the fare according to the route of the user (the route between the boarding station and the exiting station). If the calculated fare exceeds the charge amount, the authentication request processing unit 303 determines that the user is not qualified to pass through the gate device 20. If the calculated fare is equal to or less than the charge amount, the authentication request processing unit 303 determines that the specified user is qualified to pass through the gate device 20.

When the specified user is not qualified to pass through the gate device 20, the authentication request processing unit 303 sets "authentication fail" to the authentication result.

When the specified user is qualified to pass through the gate device 20, the authentication request processing unit 303 sets "authentication success" to the authentication result.

The authentication request processing unit 303 transmits the authentication result (authentication success, authentication fail) to the gate device 20 (gate device 20). In the case of the authentication success, the authentication request processing unit 303 transmits a positive response indicating the authentication success to the gate device 20. At that time, the authentication request processing unit 303 transmits a positive response including the user ID and the biological information of the user who is the target of the authentication process to the gate device 20. The biological information transmitted to the gate device 20 may be biological information registered in the user information database, or may be biological information included in the authentication request received from the gate device 20.

In the case of authentication fail, the authentication request processing unit 303 transmits a negative response indicating authentication fail to the gate device 20. When a negative response is transmitted, the authentication request processing unit 303 may also notify the gate device 20 of the cause of authentication fail. For example, the authentication request processing unit 303 may transmit, to the gate device 20, causes related to the authentication fail, such as biological information not being registered in the system, a charge amount being insufficient, or boarding station not being set.

When the response to the authentication request is transmitted to the gate device 20, the authentication request processing unit 303 sets "responded" in the entry of the relevant authentication status database. When the authentication success is notified to the gate device 20, the authentication request processing unit 303 sets the user ID of the successfully authenticated person (the user determined to be authenticated successfully) in the user ID field of the relevant entry.

The gate passage notification processing unit 304 is a means to process the gate passage notification received from the gate device 20. The gate passage notification processing unit 304 extracts the gate ID and the user ID from the received notification. The gate passage notification processing unit 304 searches the authentication status database using the gate ID and the user ID as keys, and specifies a relevant entry. The gate passage notification processing unit 304 confirms that the processing status of the specified entry is "responded".

Thereafter, the gate passage notification processing unit 304 reads the user ID from the user ID field of the specified entry. The gate passage notification processing unit 304 searches the user information database using the gate ID and the user ID as keys, and specifies a relevant entry.

The gate passage notification processing unit 304 executes a process accompanying the gate passage of the user with respect to the specified entry.

For example, in a case where the gate passage notification received from the gate device 20 at the time of entering the station is processed, the gate passage notification processing unit 304 sets the station where the gate device 20 is installed in the boarding station of the specified entry.

For example, when processing the gate passage notification received from the gate device 20 at the time of exiting from the station, the gate passage notification processing unit 304 calculates the fare of the user and subtracts the fare from the charge amount. In addition, the gate passage notification processing unit 304 clears the set value of the boarding station field.

The storage unit 305 stores various types of information necessary for the operation of the server device 10. In the storage unit 305, a user information database and an authentication status database are constructed.

Figure 11:
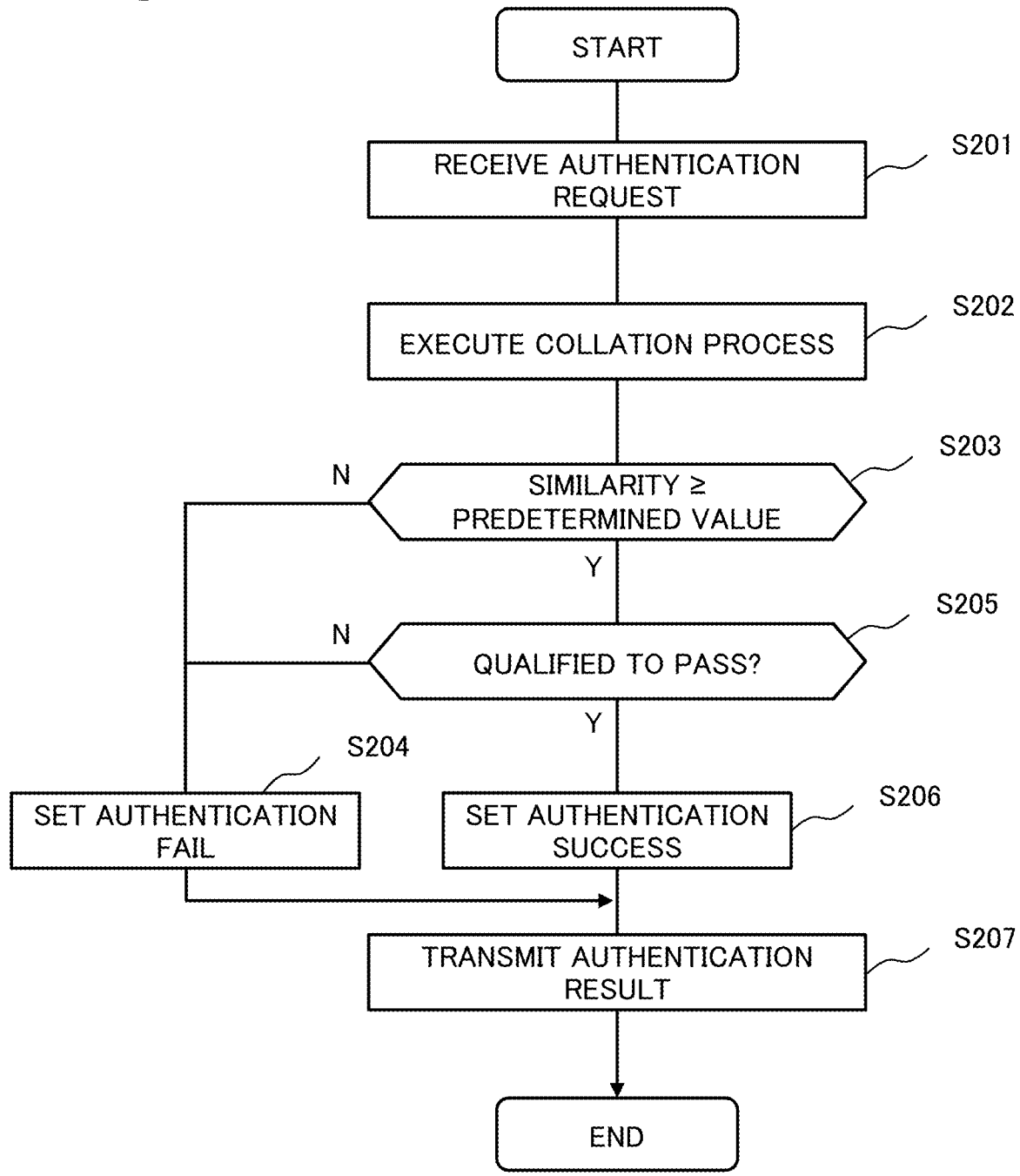
FIG. 11 is a flowchart illustrating an example of the operation of the server device according to the first example embodiment.

FIG. 11 is a flowchart illustrating an example of the operation of the server device 10 according to the first example embodiment.

The server device 10 receives the authentication request from the gate device 20 (step S201).

The server device 10 executes a collation process using the biological information included in the authentication request and the biological information registered in the user information database (step S202).

The server device 10 determines whether there is an entry in which the similarity between the pieces of biological information is equal to or more than a predetermined value (step S203).

If such an entry does not exist (step S203: No branch), the server device 10 sets the authentication result to authentication fail (step S204).

If such an entry exists (step S203: Yes branch), the server device 10 determines whether the person to be authenticated is qualified to pass through gate device 20 (step S205).

If the person to be authenticated is not qualified to pass through the gate device 20 (step S205: No branch), the server device 10 sets the authentication result to authentication fail (step S204).

If the person to be authenticated is qualified to pass through the gate device 20 (step S205: Yes branch), the server device 10 sets the authentication result to authentication success (step S206).

The server device 10 transmits the authentication result (authentication success, authentication fail) to the gate device 20 (step S207).

The description on the operation of the server device 10 when the gate passage notification is received will be omitted.

Figure 12:
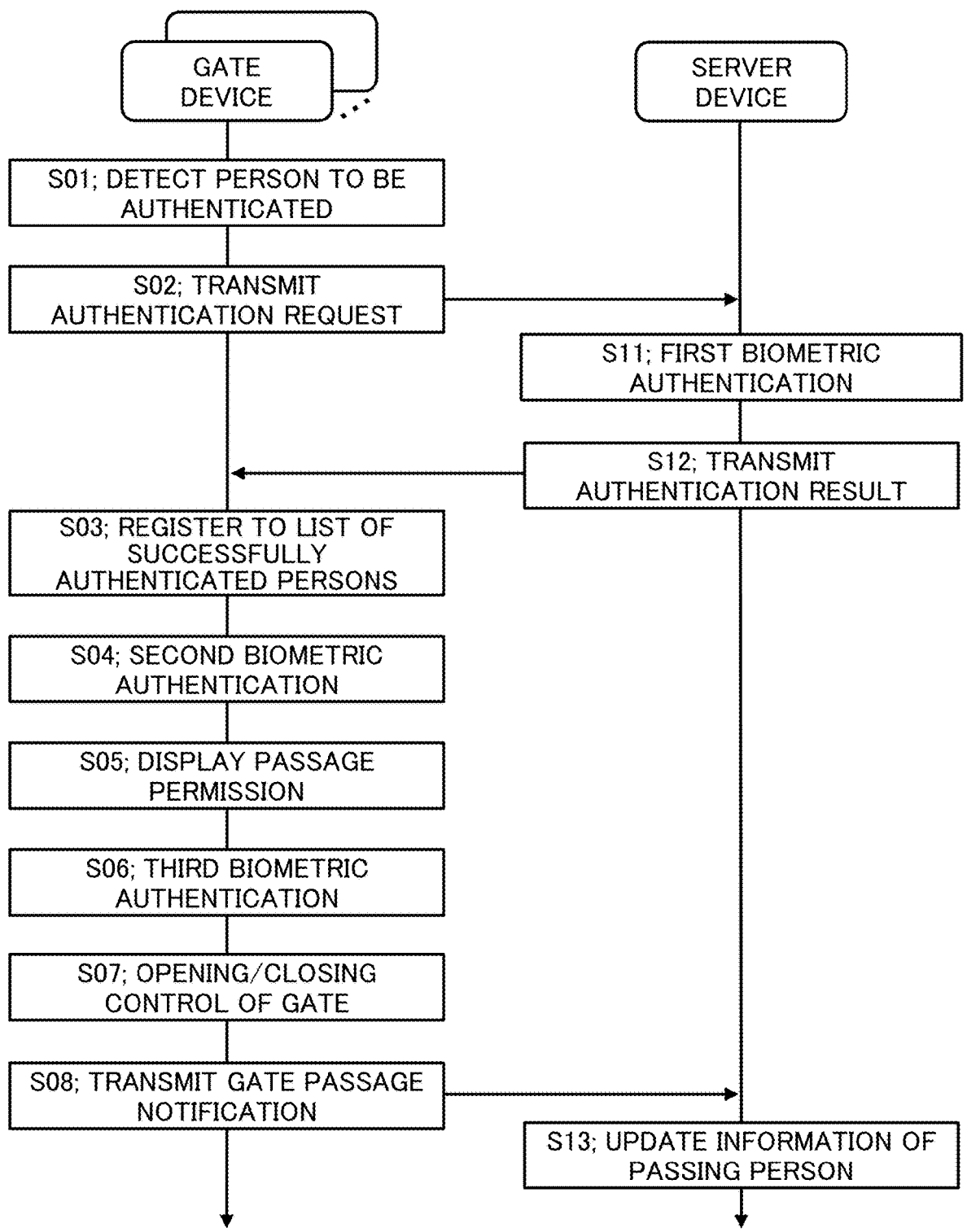
FIG. 12 is a sequence diagram illustrating an example of the operation of the authentication system according to the first example embodiment.

Next, an operation of the authentication system according to the first example embodiment will be described with reference to the drawings. FIG. 12 is a sequence diagram illustrating an example of the operation of the authentication system according to the first example embodiment. It is assumed that the system user is registered in advance prior to the operation of FIG. 12.

The gate device 20 detects the person to be authenticated (user, passenger) in the authentication area (step S01).

The gate device 20 transmits an authentication request including the biological information of the person to be authenticated to the server device 10 (step S02).

The server device 10 executes the first biometric authentication, and transmits the authentication result to the gate device 20 (steps S11 and S12). When the authentication is successful, the server device 10 transmits a positive response including the user ID of the successfully authenticated person and the biological information to the gate device 20.

When the authentication success is received, the gate device 20 registers the user ID and the biological information in the list of successfully authenticated persons (step S03).

When the user reaches the entrance of the gate device 20, the gate device 20 executes the second biometric authentication on the user using the list of successfully authenticated persons (step S04).

In the case of authentication success, the gate device 20 displays, on the monitor 32 or 33, permitting the passing of the user (step S05). Furthermore, in the case of authentication success, the gate device 20 displays, on the monitor 32 or 33 on the side opposite to the side where the user is detected, rejecting the passing of the user.

When the user reaches just before the gate 36, the gate device 20 executes the third biometric authentication on the user using the list of successfully authenticated persons (step S06).

The gate device 20 performs opening/closing control of the gate 36 using the result of the third biometric authentication (step S07).

When permitting the user to pass through the gate, the gate device 20 transmits a gate passage notification to the server device 10 (step S08).

When the gate passage notification is received, the server device 10 performs update of information of the gate passing person (successfully authenticated person; the person to be authenticated determined to be authentication success) (step S13). Specifically, the server device 10 updates the entry of the user information database relevant to the gate passing person.

Subsequently, a specific operation of the gate device 20 assuming various movements by a user (person to be authenticated, user not to be authenticated) will be described with reference to the drawings.

Figure 13:
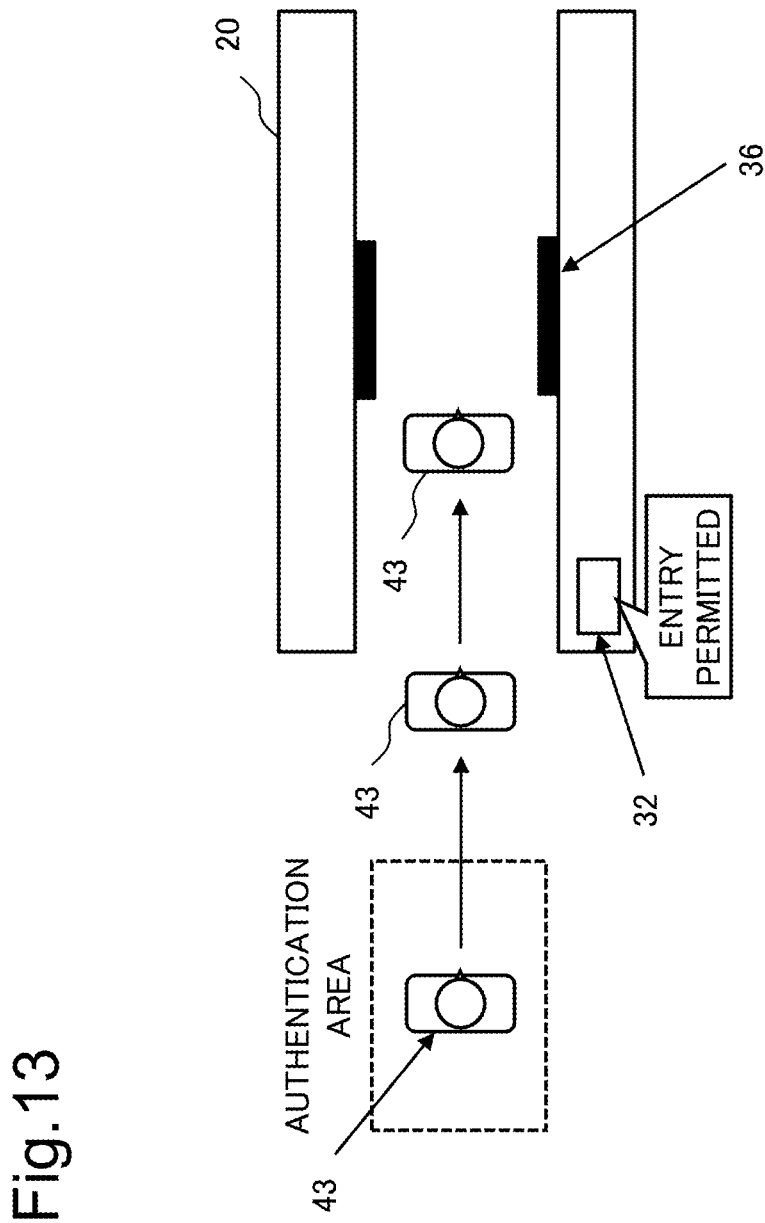
FIG. 13 is a diagram for explaining the operation of the gate device according to the first example embodiment.

As illustrated in FIG. 13, a case is considered where the user 43 passes through the authentication area, reaches the entrance of the gate device 20, and passes through the gate device 20 as is.

In this case, when the user 43 reaches the authentication area, the biometric authentication (first biometric authentication) of the user 43 is performed, and the result is transmitted to the gate device 20. More precisely, before the user 43 reaches the entrance of the gate device 20, the authentication result is transmitted to the gate device 20.

When the first biometric authentication is successful, the user ID and the biological information of the successfully authenticated person are registered in the list of successfully authenticated persons. That is, as a result of successful first biometric authentication, information (user ID, biological information) of user 43 who is qualified to pass through the gate device 20 is accumulated in the gate device 20.

When the user 43 authenticated in the authentication area reaches the entrance of the gate device 20, the second biometric authentication is performed. The second biometric authentication is performed using the biological information of the user 43 who has reached the entrance and the biological information accumulated in the gate device 20. When the second biometric authentication is successful, the gate device 20 displays such as "entry permitted" on the monitor 32.

The user 43 in contact with the display enters the gate device 20. When the user 43 arrives just before the gate 36, the third biometric authentication is performed. The third biometric authentication is performed using the biological information of the user 43 who has reached the front of the gate 36 and the biological information accumulated in the gate device 20. When the third biometric authentication is successful, the gate device 20 maintains the open state of the gate 36, and permits the user 43 to pass through the gate.

Furthermore, when permitting the user 43 to pass through the gate, the gate device 20 transmits the fact that the user 43 has passed through the gate device 20 to the server device 10. The server device 10 stores the fact that the user 43 has passed through the gate device 20 (updates the user information database).

Figure 14:
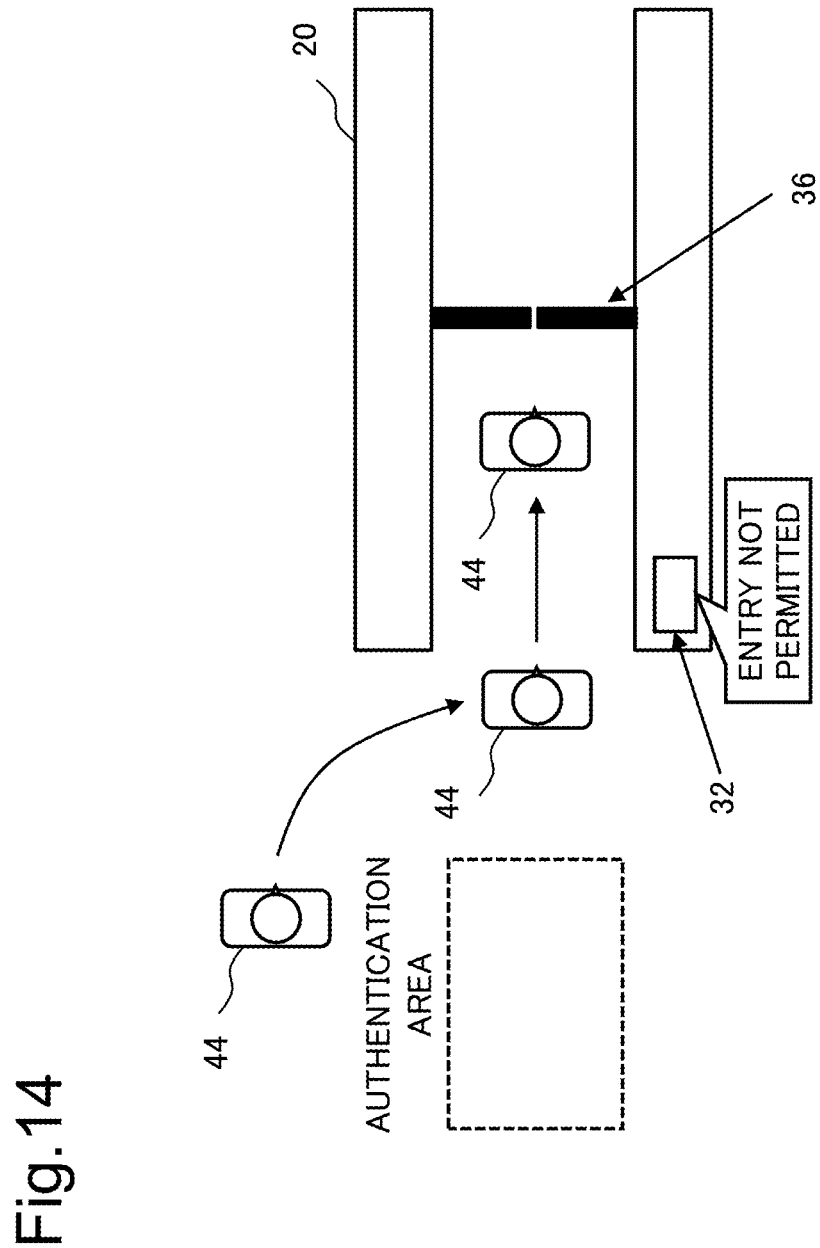
FIG. 14 is a diagram for explaining the operation of the gate device according to the first example embodiment.

As illustrated in FIG. 14, a case is considered where the user 44 does not pass through the authentication area, reaches the entrance of the gate device 20, and directly enters inside the gate device 20.

In this case, since the user 44 has not passed through the authentication area, the first biometric authentication for the user is not performed. That is, the information of the user 44 (user ID, biological information) is not registered in the list of successfully authenticated persons and is not accumulated in the gate device 20.

When the user 44 reaches the entrance of the gate device 20, the second biometric authentication is performed. However, since the biological information of the user 44 is not registered in the list of successfully authenticated persons, the authentication fails. As a result, "entering not possible" is displayed on the monitor 32.

Regardless of the display, when user 44 goes inside the gate device 20, the third biometric authentication is performed in front of the gate 36. However, since the biological information of the user 44 is not registered in the list of successfully authenticated persons, the third biometric authentication fails. Therefore, the gate device 20 closes the gate 36 and rejects the passing of the user 44 through the gate.

Figure 15:
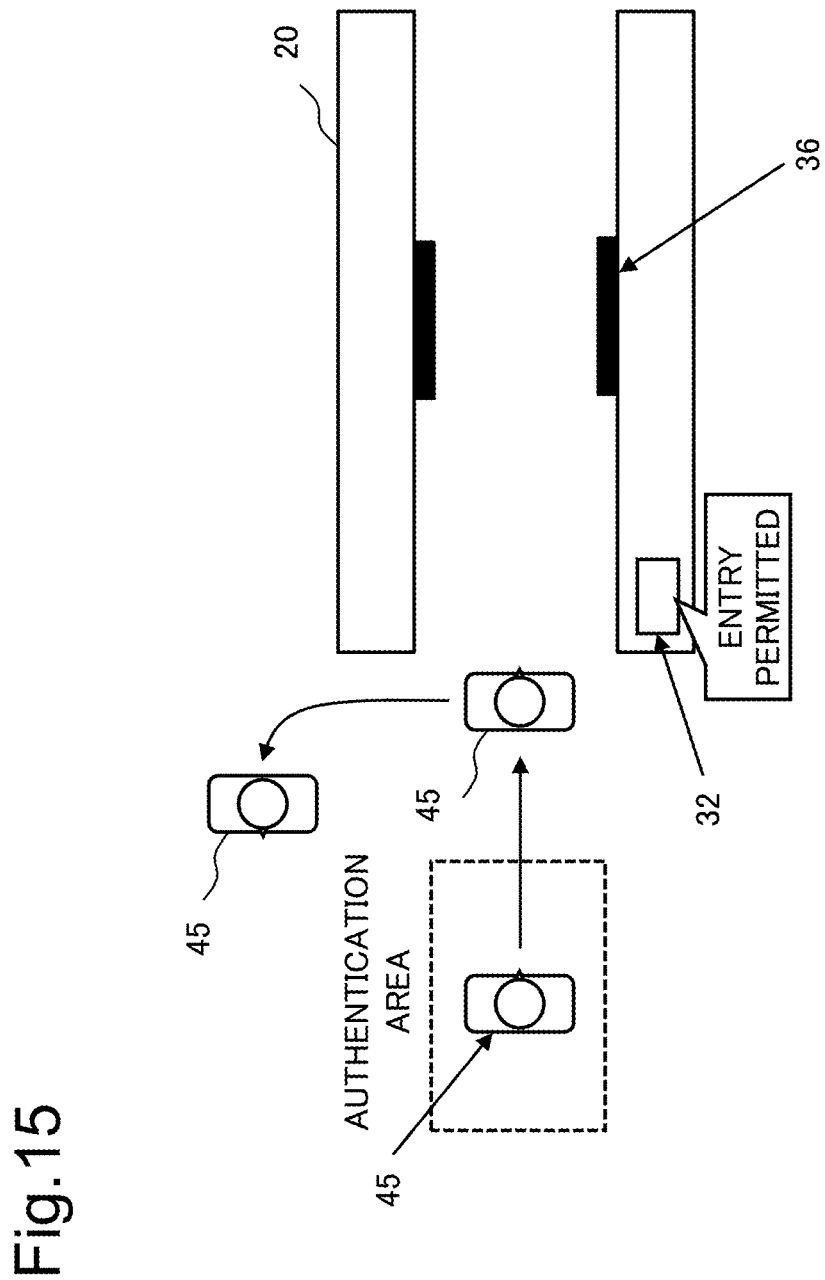
FIG. 15 is a diagram for explaining the operation of the gate device according to the first example embodiment.

As illustrated in FIG. 15, a case is considered where the user 45 turns back after passing through the authentication area and reaching the entrance of the gate device 20.

In this case, the biometric authentication (first biometric authentication) of the user 45 is performed, and information (user ID, biological information) of the user 45 is registered in the list of successfully authenticated persons.

When the user 45 reaches the entrance of the gate device 20, the second biometric authentication is performed. However, since the biological information of the user 45 is registered in the list of successfully authenticated persons, the second biometric authentication succeeds.

When user 45 returns to the side of the gate device 20 without proceeding, information of the user 45 (user ID and biological information registered in list of successfully authenticated persons) continues to remain in the gate device 20. However, when a predetermined period has elapsed after the information of the user 45 is registered in the list of successfully authenticated persons, the entry of the user 45 is deleted from the list of successfully authenticated persons.

In this way, since the information of the user who does not pass through the gate device 20 even after the predetermined period has elapsed is deleted from the list of successfully authenticated persons, the size of the list does not become unnecessarily large. Since the size of the list of successfully authenticated persons is appropriately maintained, the processing speed of the second and third biometric authentications using the list is not degraded.

In addition, when the entry of the user 45 is deleted from the list of successfully authenticated persons, the server device 10 is also notified of the deletion, and a series of authentication procedures by the server device 10 is also canceled.

As described above, in the first example embodiment, the biometric authentication is performed three times. The server device 10 specifies the user (the user in the authentication area) walking toward the gate device 20 by biometric authentication, and determines whether the specified user is qualified to pass through the gate device 20. The gate device 20 interiorly accumulates the biological information of the user (successfully authenticated person) who succeeded in the first biometric authentication (the biological information is recorded in the list of successfully authenticated persons). When detecting the user at the entrance, the gate device 20 performs biometric authentication (second biometric authentication) of the user. At that time, the gate device 20 performs the biometric authentication using the biological information accumulated therein. The list of successfully authenticated persons merely includes a small number of entries. Therefore, the second biometric authentication by the gate device 20 is terminated immediately. When the second biometric authentication is successful, the gate device 20 notifies the user at the entrance that the user may pass through the gate 360. The user who has come in contact with the notification can enter inside at ease without stopping in front of the gate device 20. In addition, when a user who has not undergone the first biometric authentication (a user whose qualification to pass through the gate device 20 is unknown) enters from the side of the gate device 20, the third biometric authentication on the user fails. When the third biometric authentication fails, the gate device 20 closes the gate and rejects the user's passage through the gate. As described above, the user who has the right to pass through the gate device 20 can pass through the gate 36 at ease, whereas the user whose authority to pass through the gate device 20 is unknown cannot pass through the gate 36.

Figure 16:
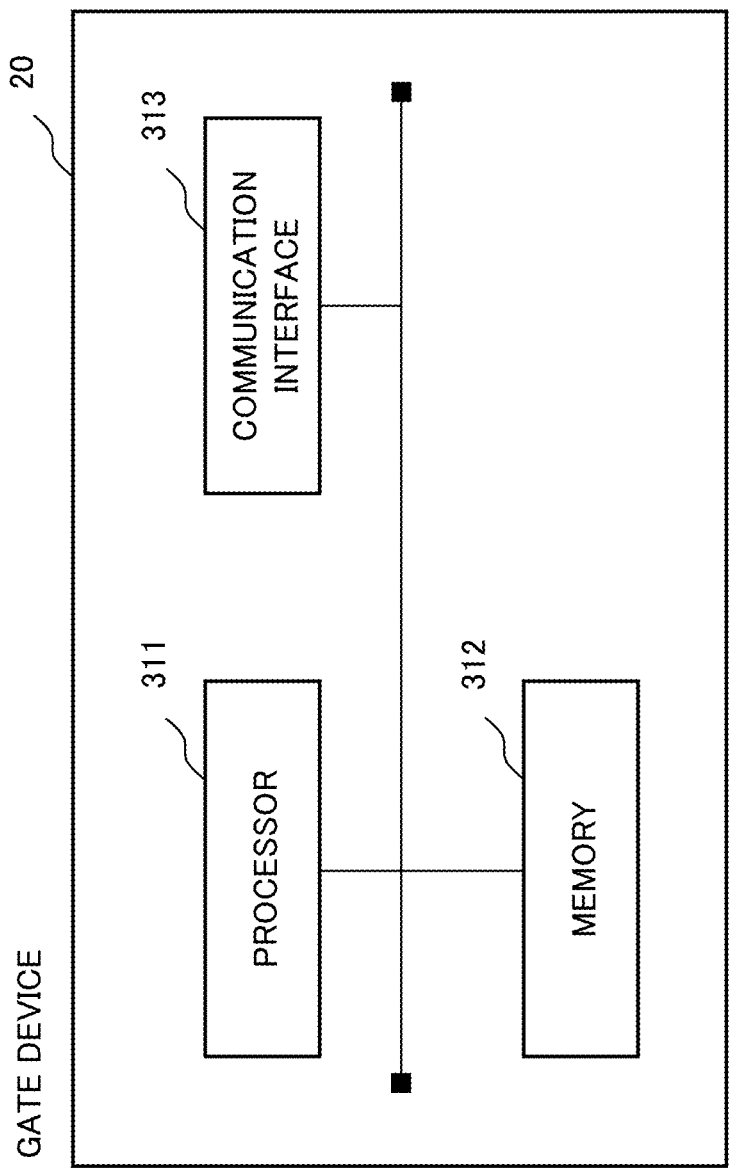
FIG. 16 is a diagram illustrating an example of a hardware configuration of a gate device according to the present disclosure.

Next, hardware of each device constituting the authentication system will be described. FIG. 16 is a diagram illustrating an example of a hardware configuration of the gate device 20.

The gate device 20 includes a processor 311, a memory 312, a communication interface 313, and the like. The components such as the processor 311 are connected by an internal bus or the like and are configured to be able to communicate with each other.

However, the configuration illustrated in FIG. 16 is not intended to limit the hardware configuration of the gate device 20. The gate device 20 may include hardware (not illustrated). In addition, the number of processors 311 and the like included in the gate device 20 is not intended to be limited to the example of FIG. 16, and for example, a plurality of processors 311 may be included in the gate device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various programs including an operating system (OS; Operating System).

The memory 312 is a random access memory (RAM), a read only memory (ROM), a hard disk drive (HDD), a solid state drive (SSD), or the like. The memory 312 stores an OS program, an application program, and various data.

The communication interface 313 is a circuit, a module, or the like that communicates with another device. For example, the communication interface 313 includes a network interface card (NIC), a bus controller, and the like.

The functions of the gate device 20 are achieved by various processing modules. The processing module is achieved, for example, by the processor 311 executing a program stored in the memory 312. Furthermore, the program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. Furthermore, the program can be downloaded via a network or updated using a storage medium storing the program. Furthermore, the processing module may be achieved by a semiconductor chip.

The gate device 20 is equipped with a computer, and the function of the gate device 20 can be achieved by causing the computer to execute a program. Furthermore, the gate device 20 executes a control method of the gate device 20 by the program.

In addition, as illustrated in FIG. 3 and the like, the gate device 20 includes a camera 31, monitors 32 and 33, detection sensors 34 and 35, a gate 36, and the like.

The camera 31 is a camera device capable of acquiring a visible light image. In FIG. 3 and the like, a case where the gate device 20 includes one camera 31 has been described, but the gate device 20 may include a plurality of cameras 31. For example, a plurality of cameras 31 may be installed in the gate device 20 for each application. For example, the camera 31 for detecting the person to be authenticated, the camera 31 for the second biometric authentication, and the camera 31 for the third biometric authentication may be installed in the gate device 20.

Alternatively, instead of the camera 31 for detecting the person to be authenticated, the person to be authenticated may be detected by another means. For example, a person in the authentication area away from the gate device 20 by a predetermined distance may be detected using a human sensor or the like. Alternatively, the camera 31 may acquire image data in response to detection of a person by the human sensor, and the person to be authenticated may be detected.

The monitors 32 and 33 are display devices such as liquid crystal monitors.

The detection sensors 34 and 35 are sensors that detect a person. The detection sensors 34 and 35 are devices that detect movement of a person or the like when the person or the like moves in the sensing range. The detection sensors 34 and 35 detect a person or the like using infrared light or the like.

In the above example embodiment, the case where the user near the entrance of the gate device 20 and the user in front of the gate 36 are detected using the detection sensors 34 and 35 has been described. However, these users may be detected by image processing obtained from the camera 31.

The gate 36 is a device that controls the passing of the user. The type of the gate 36 is not particularly limited, and is, for example, a flapper gate in which a flapper provided from one side or both sides of the passage opens and closes, a turn style gate in which three bars rotate, or the like.

The server device 10 can be configured by an information processing device. The server device 10 merely needs to include a processor, a memory, a communication interface, and the like similarly to the gate device 20, and a detailed description thereof will be omitted because a configuration thereof is obvious to those skilled in the art.

Modified Example

The configuration, operation, and the like of the authentication system described in the above example embodiment are merely examples, and are not intended to limit the configuration and the like of the system.

In the above example embodiment, the gate device 20 has been described as a ticket gate installed in a station. However, it is needless to say that the gate device 20 is not to be limited to a ticket gate. The gate device 20 may be any device that is installed in an airport, an event venue, an office, or the like and controls passing of a user.

In the above example embodiment, description has been made that the monitor 32 that provides information to the user on the left side and the monitor 33 that provides information to the user on the right side are different devices. However, information may be provided to each of the right and left users using a device that can be displayed on both sides.

In the above example embodiment, description has been made that the words (entry permitted, entry not permitted) are displayed on the monitors 32 and 33, but instead of or in addition to the words, symbols, icons, animations, or the like may be used to notify the user of whether entry to the gate device 20 is permitted. Alternatively, the user may be notified that entry is permitted or that entry is not permitted by a display mode of the monitors 32 and 33, such as blinking or turning off of the monitors 32 and 33.

In the above example embodiment, the case where the server device 10 includes the user information database and the authentication status database has been described. However, these databases may be constructed in a database server different from the server device 10. In addition, the authentication system may include various means (the authentication request unit 203 etc.) described in the above example embodiment.

In the above example embodiment, the case where the biological information related to the feature amount generated from the face image is transmitted from the gate device 20 to the server device 10 has been described. However, the "face image" itself may be transmitted as the biological information from the gate device 20 to the server device 10. The server device 10 may generate a feature amount from the acquired face image and execute the authentication process (one-to-N collation).

In the above example embodiment, the camera 31 is assumed to be a monocular camera, but the camera 31 may be a depth camera (stereo camera) that can measure the depth direction. In this case, the gate device 20 may detect the person to be authenticated in the authentication area away from the gate device 20 by a predetermined distance using an image obtained from the stereo camera instead of the threshold process on the interocular distance. Specifically, the gate device 20 analyzes two images obtained from the stereo camera (analysis using parallax), and calculates the position of the user with reference to the gate device 20. If the calculated position is included in the predetermined place, the gate device 20 sets the user as the person to be authenticated.

A form of data transmission and reception between the gate device 20 and the server device 10 is not particularly limited, but data transmitted and received between these devices may be encrypted. The face image and the feature amount calculated from the face image are personal information, and it is desirable that encrypted data is transmitted and received in order to appropriately protect the personal information.

In the above example embodiment, description has been made that the gate device 20 transmits the gate passage notification to the server device 10 when the third biometric authentication is successful. However, the gate device 20 may transmit the gate passage notification to the server device 10 after confirming that the user has passed through the gate 36. Specifically, the gate device 20 may detect passage of the gate 36 based on a detection signal from a detection sensor installed immediately after the gate 36, and transmit the gate passage notification in response to the detection.

The authentication result (authentication success) by the server device 10 may be shared by each gate device 20. For example, in FIG. 2, when the authentication is successful as a result of processing the authentication request from the gate device 20-1, the server device 10 may transmit a positive response including the biological information and the user ID of the successfully authenticated person to other gate devices 20-2 and 20-3. The other gate devices 20-2 and 20-3 record the received biological information and the user ID in the list of successfully authenticated persons when the other gate device 20-1 transmits the authentication request. The gate devices 20-2 and 20-3 can execute the second and third biometric authentications using such a list of successfully authenticated persons to allow the user who is qualified to pass through the authentication area through the gate device 20 but deviated from the regular route (route advancing straight) to pass through the gate.

In the above example embodiment, description has been made that the gate passage notification including the user ID is transmitted to the server device 10, but the gate passage notification including the biological information may be transmitted to the server device 10 instead of the user ID. The server device 10 may specify the user who has passed through the gate by biometric authentication (collation process) using the acquired biological information.

In the above example embodiment, the case where the gate device 20 performs the biometric authentication (second and third biometric authentications) twice has been described, but the gate device 20 may execute the biometric authentication once. For example, the gate device 20 executes the biometric authentication when the user reaches the entrance. When the authentication is successful, the gate device 20 may notify the user of the gate passage permission and maintain the open state of the gate 36.

Alternatively, the gate device 20 may control the monitors 32, 33 according to the result of the biometric authentication (first biometric authentication) by the server device 10. At this time, the authentication area can be set to X1 to X3. Specifically, if the result of the first biometric authentication is "authentication success", the gate device 20 notifies the user of the gate passage permission ("entry permitted" is displayed on the monitor 32 or 33). Thereafter, the gate device 20 may execute the biometric authentication (third biometric authentication) just before the gate 36 without executing the biometric authentication (second biometric authentication) near the entrance. As a result, the user who has confirmed the display of "entry permitted" can enter the inside of the gate device 20 at ease, and can reject the gate passage of the person who is not qualified to pass through the gate device 20 by the third biometric authentication.

In the above example embodiment, the case where the passage of the user is controlled by the gate 36 has been described. However, the passage of the user may be controlled by other means without controlling the passage of the user by physical means. For example, when a user who is not qualified to pass through the gate device 20 enters the gate device 20, the passage of the user may be restricted by voice from a speaker, monitor display, lighting and blinking of a light emitting diode (LED) or the like.

In the flow chart (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiment has been described in detail in order to facilitate the understanding of the present disclosure, and is not intended that all the configurations described above are necessary. In addition, in a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the Industrial Applicability of the present invention is apparent from the above description, the present invention can be suitably applied to an authentication system installed in an airport, a station, or the like.

Some or all of the above example embodiments may be described as the following supplementary notes, but are not limited to the following.

[Supplementary Note 1]

A system including:
a server device that performs a first biometric authentication using biological information of each of a plurality of users; and
a gate device connected to the server device, wherein
the gate device includes,
an authentication request unit that, when a first user is detected in an authentication area a predetermined distance away from the gate device, requests the server device to perform the first biometric authentication on the detected first user, and registers biological information of the first user who succeeded in the first biometric authentication in a list of successfully authenticated persons,
a first authentication unit that, when a second user is detected at a first position closer to the own device than the authentication area, executes a second biometric authentication using biological information of the second user detected at the first position and biological information registered in the list of successfully authenticated persons,
a second authentication unit that, when a third user is detected at a second position in the own device, executes a third biometric authentication using biological information of the third user detected at the second position and biological information registered in the list of successfully authenticated persons, and
a gate control unit that, when the third biometric authentication is successful, permits the third user to pass through a gate, and
when the second biometric authentication is successful, the first authentication unit notifies the second user that the second user can pass through the gate.

[Supplementary Note 2]

The system according to supplementary note 1, further including a list management unit that deletes biological information in which a predetermined period has elapsed since registration to the list of successfully authenticated persons.

[Supplementary Note 3]

The system according to supplementary note 2, wherein the list management unit deletes the biological information of the third user from the list of successfully authenticated persons in response to the third user passing through the gate.

[Supplementary Note 4]

The system according to any one of supplementary notes 1 to 3, further including a person to be authenticated detection unit that detects the first user in the authentication area.

[Supplementary Note 5]

The system according to supplementary note 4, wherein the person to be authenticated detection unit detects the first user based on an interocular distance calculated from a face image included in image data obtained by photographing the authentication area.

[Supplementary Note 6]

The system according to any one of supplementary notes 1 to 5, wherein the authentication request unit acquires biological information and a user ID of the first user from the server device, and registers the biological information and the user ID in the list of successfully authenticated persons.

[Supplementary Note 7]

The system according to supplementary note 6, wherein the gate control unit transmits a gate passage notification including the user ID of the third user who has passed the gate to the server device.

[Supplementary Note 8]

The system according to any one of supplementary notes 1 to 7, wherein when the second biometric authentication is successful, the first authentication unit notifies a fourth user on a side opposite to a side where the second user is detected that the fourth user cannot pass through the gate.

[Supplementary Note 9]

The system according to any one of supplementary notes 1 to 8, wherein the biological information is a face image or a feature amount generated from the face image.

[Supplementary Note 10]

A gate device including:
an authentication request unit that, when a first user is detected in an authentication area a predetermined distance away from an own device, requests a server device to perform a first biometric authentication on the detected first user using biological information of each of a plurality of users, and registers biological information of the first user who succeeded in the first biometric authentication in a list of successfully authenticated persons;
a first authentication unit that, when a second user is detected at a first position closer to the own device than the authentication area, executes a second biometric authentication using biological information of the second user detected at the first position and biological information registered in the list of successfully authenticated persons;
a second authentication unit that, when a third user is detected at a second position in the own device, executes a third biometric authentication using biological information of the third user detected at the second position and biological information registered in the list of successfully authenticated persons; and
a gate control unit that, when the third biometric authentication is successful, permits the third user to pass through a gate, wherein
when the second biometric authentication is successful, the first authentication unit notifies the second user that the second user can pass through the gate.

[Supplementary Note 11]

A method for controlling a gate device, wherein
in the gate device,
when a first user is detected in an authentication area a predetermined distance away from an own device, a first biometric authentication on the detected first user is requested to a server device that performs the first biometric authentication using biological information of each of a plurality of users;
biological information of the first user who succeeded in the first biometric authentication is registered in a list of successfully authenticated persons;
when a second user is detected at a first position closer to the own device than the authentication area, a second biometric authentication using biological information of the second user detected at the first position and biological information registered in the list of successfully authenticated persons is executed;
when a third user is detected at a second position in the own device, a third biometric authentication using biological information of the third user detected at the second position and biological information registered in the list of successfully authenticated persons is executed;
when the third biometric authentication is successful, the third user is permitted to pass through a gate; and
when the second biometric authentication is successful, the second user is notified that the second user can pass through the gate.

[Supplementary Note 12]

A computer readable storage medium storing a program that causes a computer mounted on a gate device to execute processes of:
requesting, when a first user is detected in an authentication area a predetermined distance away from an own device, a first biometric authentication on the detected first user to a server device that performs the first biometric authentication using biological information of each of a plurality of users;
registering biological information of the first user who succeeded in the first biometric authentication in a list of successfully authenticated persons;
executing, when a second user is detected at a first position closer to the own device than the authentication area, a second biometric authentication using biological information of the second user detected at the first position and biological information registered in the list of successfully authenticated persons;
executing, when a third user is detected at a second position in the own device, a third biometric authentication using biological information of the third user detected at the second position and biological information registered in the list of successfully authenticated persons;
permitting, when the third biometric authentication is successful, the third user to pass through a gate; and
notifying, when the second biometric authentication is successful, the second user that the second user can pass through the gate.

The disclosures of the cited prior art documents are incorporated herein by reference. Although the example embodiments of the present invention have been described above, the present invention is not limited to these example embodiments. It should be understood by those skilled in the art that these example embodiments are merely examples and that various variations are possible without deviating from the scope and spirit of the invention. That is, it goes without saying that the present invention includes various modifications and corrections that can be made by those skilled in the art in accordance with the entire disclosure including the claims and the technical idea.

REFERENCE SIGNS LIST

10, 101 server device
20, 20-1 to 20-3, 102 gate device 31 camera
32, 33 monitor
34, 35 detection sensor
36 gate
41 to 45 user
111, 203 authentication request unit
112, 205 first authentication unit
113, 206 second authentication unit
114, 207 gate control unit
201, 301 communication control unit
202 person to be authenticated detection unit
204 list management unit
208, 305 storage unit
302 user registration unit
303 authentication request processing unit
304 gate passage notification processing unit
311 processor
312 memory
313 communication interface

What is claimed is:

1. A gate device connected to a server device that performs a first biometric authentication using biological information of each of a plurality of users, comprising:
    a memory storing instructions; and
    a processor connected to the memory and configured to execute the instructions to:
    request, when a first user is detected in an authentication area a predetermined distance away from the gate device, the server device to perform the first biometric authentication on the detected first user;
    in response to the first biometric authentication being successful, register biological information of the first user in a list of successfully authenticated persons;
    in response to the first biometric authentication being unsuccessful, reject the biological information of the first user from being registered in the list of successfully authenticated persons;
    execute, when a second user is detected at a first position closer to the gate device than the authentication area, a second biometric authentication by determining whether biological information of the second user detected at the first position matches biological information registered in the list of successfully authenticated persons;
    execute, when a third user is detected at a second position in the gate device, a third biometric authentication by determining whether biological information of the third user detected at the second position matches the biological information registered in the list of successfully authenticated persons;
    permit, when the third biometric authentication is successful, the third user to pass through a gate;
    notify, when the second biometric authentication is successful, the second user that the second user can pass through the gate, and simultaneously notify a fourth user on a side opposite to a side where the second user is detected that the fourth user cannot pass through the gate; and
    prevent, when the third biometric authentication is unsuccessful, the third user from passing through the gate.

2. The gate device according to claim 1, wherein the processor is configured to execute the instructions to delete biological information of a user in which a predetermined period has elapsed since registration of the biological information of the user to the list of successfully authenticated persons.

3. The gate device according to claim 2, wherein the processor is configured to execute the instructions to delete the biological information of the third user from the list of successfully authenticated persons in response to the third user passing through the gate.

4. The gate device according to claim 1, wherein the processor is configured to execute the instructions to detect the first user in the authentication area.

5. The gate device according to claim 4, wherein the processor is configured to execute the instructions to detect the first user based on an interocular distance calculated from a face image of the first user included in image data obtained by photographing the authentication area.

6. The gate device according to claim 1, wherein the processor is configured to execute the instructions to acquire biological information and a user ID of the first user from the server device, and register the biological information and the user ID in the list of successfully authenticated persons.

7. The gate device according to claim 6, wherein the processor is configured to execute the instructions to transmit a gate passage notification including the user ID of the third user who has passed the gate to the server device.

8. The gate device according to claim 1, wherein biological information of a user is a face image of the user or a feature amount generated from the face image of the user.

9. A method for controlling a gate device executed by a computer included in the gate device, the method comprising
    requesting, when a first user is detected in an authentication area a predetermined distance away from the gate device, a first biometric authentication on the detected first user to a server device that performs the first biometric authentication using biological information of each of a plurality of users;
    in response to the first biometric authentication being successful, registering biological information of the first user in a list of successfully authenticated persons;
    in response to the first biometric authentication being unsuccessful, rejecting the biological information of the first user from being registered in the list of successfully authenticated persons;
    executing, when a second user is detected at a first position closer to the gate device than the authentication area, a second biometric authentication by determining whether biological information of the second user detected at the first position matches biological information registered in the list of successfully authenticated persons;
    executing, when a third user is detected at a second position in the gate device, a third biometric authentication by determining whether biological information of the third user detected at the second position matches the biological information registered in the list of successfully authenticated persons;
    permitting, when the third biometric authentication is successful, the third user to pass through gate;
    notifying, when the second biometric authentication is successful, the second user that the second user can pass through the gate, and simultaneously notifying a fourth user on a side opposite to a side where the second user is detected that the fourth user cannot pass through the gate; and
    preventing, when the third biometric authentication is unsuccessful, the third user from passing through the gate.

10. A non-transitory computer readable storage medium storing a program that causes a computer mounted on a gate device to execute processes of:

requesting, when a first user is detected in an authentication area a predetermined distance away from the gate device, a first biometric authentication on the detected first user to a server device that performs the first biometric authentication using biological information of each of a plurality of users;

in response to the first biometric authentication being successful, registering biological information of the first user in a list of successfully authenticated persons;

in response to the first biometric authentication being unsuccessful, rejecting the biological information of the first user from being registered in the list of successfully authenticated persons;

executing, when a second user is detected at a first position closer to the gate device than the authentication area, a second biometric authentication by determining whether biological information of the second user detected at the first position matches biological information registered in the list of successfully authenticated persons;

executing, when a third user is detected at a second position in the gate device, a third biometric authentication by determining whether biological information of the third user detected at the second position matches the biological information registered in the list of successfully authenticated persons;

permitting, when the third biometric authentication is successful, the third user to pass through gate;

notifying, when the second biometric authentication is successful, the second user that the second user can pass through the gate, and simultaneously notifying a fourth user on a side opposite to a side where the second user is detected that the fourth user cannot pass through the gate; and preventing, when the third biometric authentication is unsuccessful, the third user from passing through the gate.

* * * * *